US012226965B2

(12) United States Patent
Lewit et al.

(10) Patent No.: US 12,226,965 B2
(45) Date of Patent: Feb. 18, 2025

(54) STRUCTURAL COMPOSITE PREFORM WET-OUT AND CURING SYSTEM AND APPARATUS

(71) Applicant: COMPOSITES INTELLECTUAL HOLDINGS, INC., West Melbourne, FL (US)

(72) Inventors: Scott Lewit, Melbourne, FL (US); Ronnal P. Reichard, Melbourne, FL (US)

(73) Assignee: COMPOSITES INTELLECTUAL HOLDINGS, INC., West Melbourne, FL (US)

( * ) Notice: Subject to any disclaimer, the term of this patent is extended or adjusted under 35 U.S.C. 154(b) by 0 days.

(21) Appl. No.: 16/364,048

(22) Filed: Mar. 25, 2019

(65) Prior Publication Data

US 2019/0217557 A1 Jul. 18, 2019

Related U.S. Application Data

(63) Continuation of application No. 14/214,913, filed on Mar. 15, 2014, now Pat. No. 10,239,265.
(Continued)

(51) Int. Cl.
*B05C 9/14* (2006.01)
*B05C 5/02* (2006.01)
(Continued)

(52) U.S. Cl.
CPC .............. *B29C 70/50* (2013.01); *B05C 5/02* (2013.01); *B05C 9/14* (2013.01); *B29B 15/10* (2013.01); *B29B 15/127* (2013.01)

(58) Field of Classification Search
CPC ..................................................... B05C 9/14
See application file for complete search history.

(56) References Cited

U.S. PATENT DOCUMENTS 2,295,928 A * 9/1942 Bower .................... B05B 14/20
118/326
3,007,208 A 11/1961 Urban
(Continued)

FOREIGN PATENT DOCUMENTS

JP 59-176147 10/1984
JP 61-35912 2/1986
(Continued)

OTHER PUBLICATIONS

Final Office Action dated Mar. 15, 2014, U.S. Appl. No. 14/214,913.
(Continued)

*Primary Examiner* — Binu Thomas
(74) *Attorney, Agent, or Firm* — Lowndes; Stephen C. Thomas; Robert R. Fredeking

(57) ABSTRACT

In accordance with one embodiment of the present invention, the invention comprises a continuous structural composite preform wet out system and apparatus which takes as an input pre-formed structural composite structures with a structural foam core, passes these structures through a wetting system which may comprise sprayers, brushes, a die or dies, or other wetting means; applies a cure process such as ultraviolet light, heat, curing agent or other cure method, and produces a completed, cured structural composite structure such as a beam or panel for use in any structure as desired by the user. The improved structural composite wet out system of the invention provides run rate, ease of use, structure efficiency and handling advantages over the pultrusion systems of the prior art by achieving higher production rates, the ability to use light cure resins and the ability to produce composite structures of non-uniform cross-section.

7 Claims, 27 Drawing Sheets

Related U.S. Application Data

(60) Provisional application No. 61/791,995, filed on Mar. 15, 2013.

(51) Int. Cl.
*B29B 15/10* (2006.01)
*B29B 15/12* (2006.01)
*B29C 70/50* (2006.01)

(56) References Cited

U.S. PATENT DOCUMENTS

| | | | |
|---|---|---|---|
| 3,013,922 A | | 12/1961 | Fisher |
| 3,080,267 A | | 3/1963 | Schmalz |
| 3,124,626 A | | 3/1964 | Graham et al. |
| 3,282,761 A | | 11/1966 | Evangelist |
| 3,703,739 A | | 11/1972 | Young et al. |
| 3,834,962 A | | 9/1974 | Strumbos |
| 3,930,464 A | * | 1/1976 | Wallsten ............... B05B 14/00 118/122 |
| 3,993,828 A | | 11/1976 | McCorsley, III |
| 4,022,644 A | | 5/1977 | Smith, Jr. |
| 4,075,304 A | | 2/1978 | Watson |
| 4,188,314 A | | 2/1980 | Fox et al. |
| 4,390,564 A | * | 6/1983 | Kimble ............... B05B 13/0221 427/542 |
| 4,498,941 A | * | 2/1985 | Goldsworthy .......... B29C 63/00 156/148 |
| 4,614,013 A | | 9/1986 | Stevenson |
| 4,755,341 A | | 7/1988 | Reavely et al. |
| 4,769,437 A | | 9/1988 | Blount |
| 4,836,964 A | | 6/1989 | Tsai |
| 4,902,215 A | | 2/1990 | Seemann, III |
| 5,009,687 A | | 4/1991 | Kromrey |
| 5,043,114 A | | 8/1991 | Saito et al. |
| 5,056,199 A | | 10/1991 | Stein et al. |
| 5,129,813 A | | 7/1992 | Shepherd |
| 5,262,230 A | | 11/1993 | Becker et al. |
| 5,281,634 A | | 1/1994 | Hesse et al. |
| 5,429,066 A | | 7/1995 | Lewit et al. |
| 5,549,771 A | | 8/1996 | Brooker |
| 5,580,502 A | | 12/1996 | Foster et al. |
| 5,622,660 A | | 4/1997 | Uemura et al. |
| 5,632,940 A | | 5/1997 | Whatley |
| 5,650,477 A | | 7/1997 | Parodi et al. |
| 5,664,518 A | | 9/1997 | Lewit et al. |
| 5,756,600 A | | 5/1998 | Okumura et al. |
| 5,800,749 A | | 9/1998 | Lewit et al. |
| 5,830,308 A | | 11/1998 | Reichard |
| 5,897,818 A | | 4/1999 | Lewit et al. |
| 6,013,213 A | | 1/2000 | Lewit et al. |
| 6,084,488 A | | 4/2000 | Fink |
| 6,355,339 B1 | | 3/2002 | Sherwood |
| 6,497,190 B1 | | 12/2002 | Lewit |
| 6,630,095 B2 | | 10/2003 | Slaughter et al. |
| 6,638,466 B1 | | 10/2003 | Abbott |
| 6,723,273 B2 | | 4/2004 | Johnson et al. |
| 6,755,998 B1 | | 6/2004 | Reichard et al. |
| 6,869,561 B2 | | 3/2005 | Johnson et al. |
| 6,911,252 B2 | | 6/2005 | Lewit et al. |
| 8,474,871 B1 | | 7/2013 | Ludwick |
| 2001/0015222 A1 | * | 8/2001 | Lewit ..................... B29C 70/50 222/55 |
| 2006/0287463 A1 | | 12/2006 | Wehner |
| 2007/0001343 A1 | | 1/2007 | Ashai et al. |
| 2007/0049686 A1 | | 3/2007 | Bauchet et al. |
| 2008/0160307 A1 | | 7/2008 | Bauchet et al. |
| 2008/0276974 A1 | * | 11/2008 | Wurster ................... B08B 3/041 134/42 |
| 2014/0199551 A1 | | 7/2014 | Lewit |
| 2014/0227507 A1 | * | 8/2014 | Brophy ................... B05C 1/003 118/696 |
| 2014/0262011 A1 | | 9/2014 | Lewit |
| 2015/0083039 A1 | * | 3/2015 | Kitamura ............... B05C 13/00 118/68 |

FOREIGN PATENT DOCUMENTS

| | | |
|---|---|---|
| JP | 62-59013 | 3/1987 |
| JP | 2011063724 | 3/2011 |
| WO | 2004013236 | 2/2004 |
| WO | 2006-091446 | 8/2006 |

OTHER PUBLICATIONS

Final Office Action dated Mar. 24, 2016, U.S. Appl. No. 14/214,913.
Non-Final Office Action dated Feb. 12, 2018, U.S. Appl. No. 14/214,913.
Non-Final Office Action dated Mar. 15, 2014, U.S. Appl. No. 14/214,913.

* cited by examiner

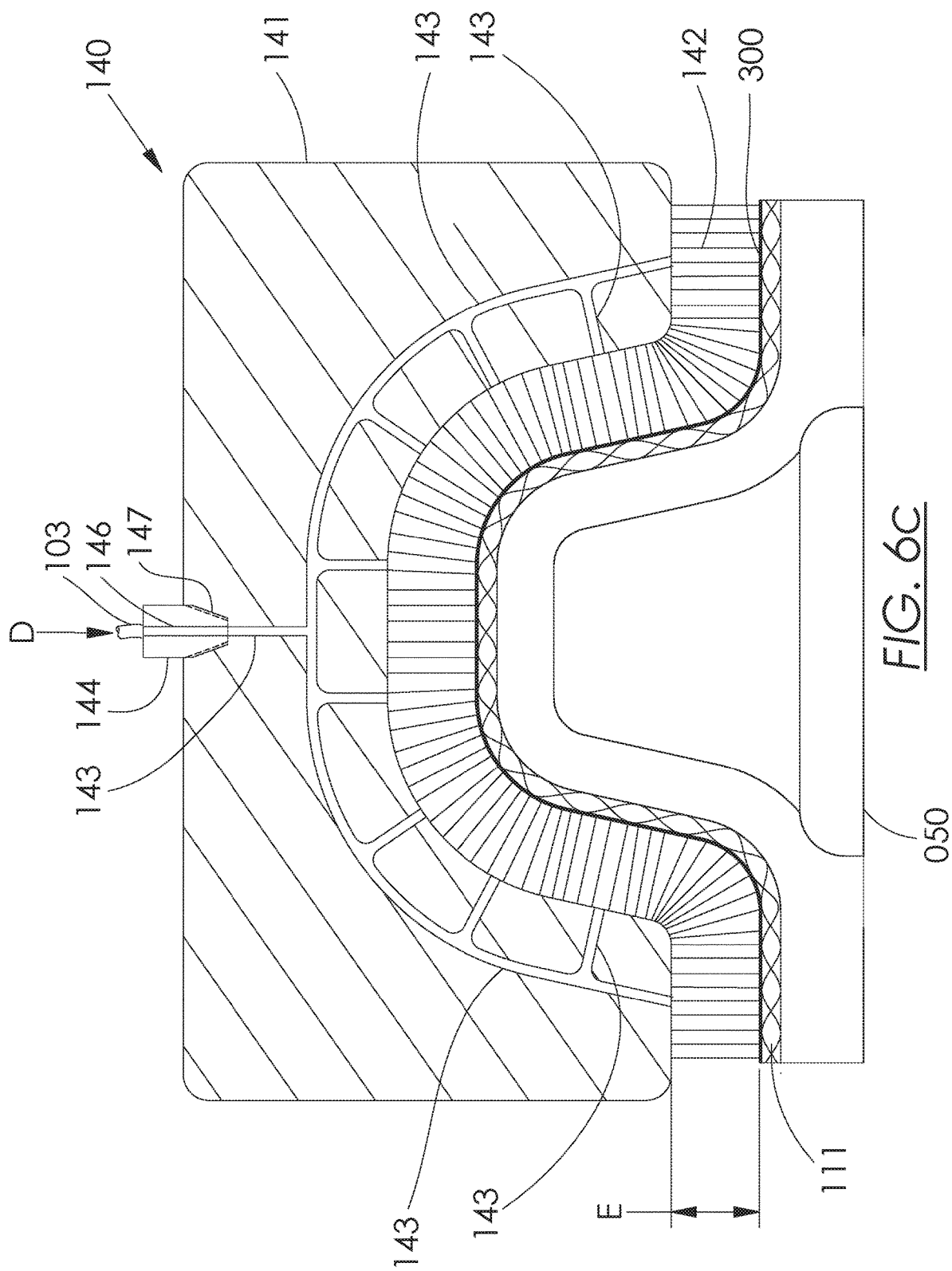

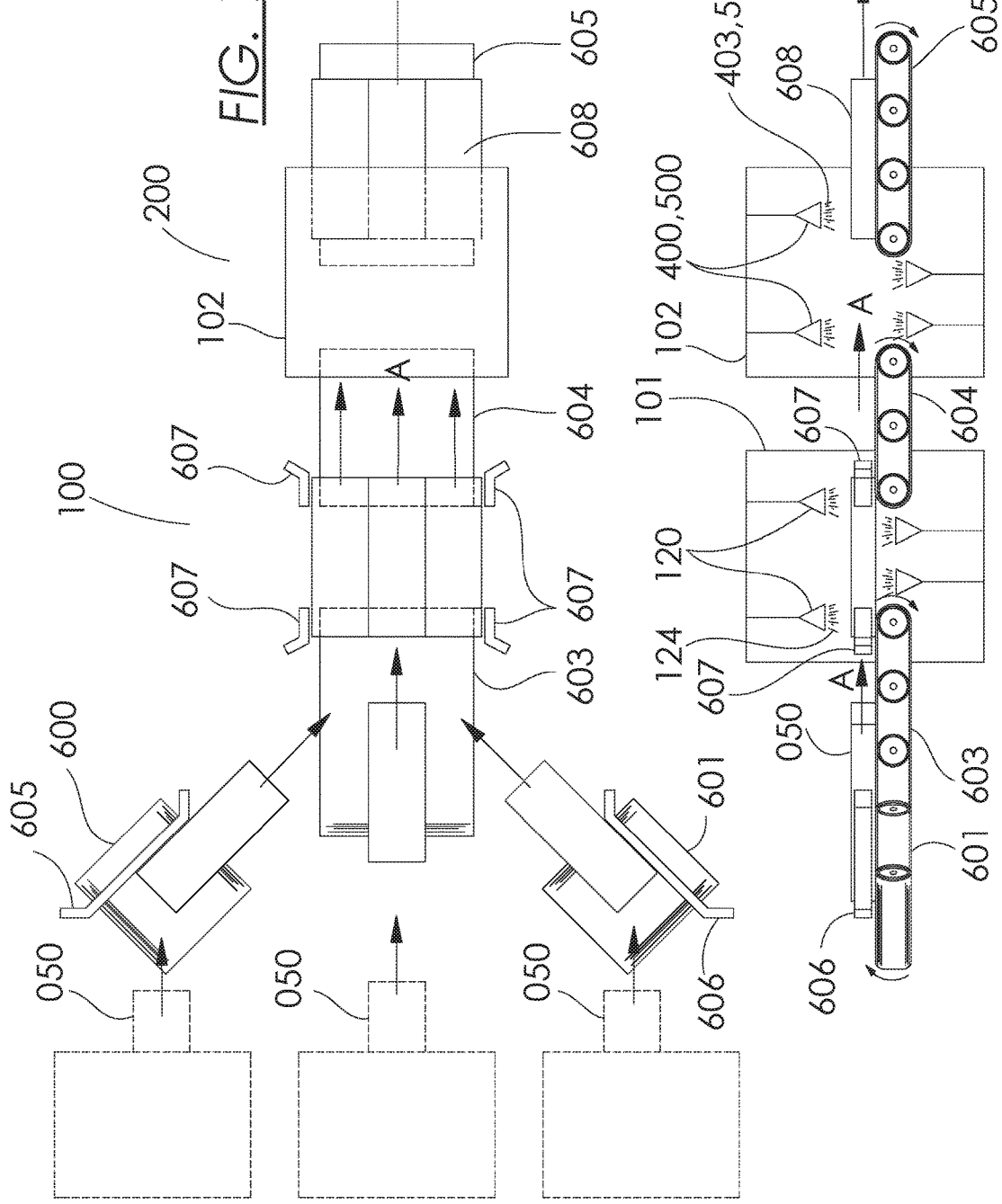

# STRUCTURAL COMPOSITE PREFORM WET-OUT AND CURING SYSTEM AND APPARATUS

CROSS REFERENCE TO RELATED APPLICATIONS

This United States non-provisional application, filed under 35 U.S.C. 111(a), is a continuation of U.S. non-provisional application Ser. No. 14/214,913, filed in the United States Patent and Trademark Office (USPTO) on Mar. 15, 2014, which is hereby incorporated by reference in its entirety; which was a non-provisional of, and claimed benefit of priority to, U.S. provisional application Ser. No. 61/791,995, which was filed in the United States Patent and Trademark Office (USPTO) on Mar. 15, 2013 and which is also incorporated herein by reference in its entirety. U.S. Pat. No. 5,429,066; U.S. Pat. No 6,543,469, System For Continuously Manufacturing A Composite Preform to Lewit et al.; U.S. Pat. No. 5,897,818, Method for Continuously Manufacturing a Composite Preform to Lewit et al. U.S. Pat. No. 6,013,213 to Lewit et al.; and U.S. Pat. No. 5,908,591 to Lewit et al. are also each incorporated herein by reference in their entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to composite structure manufacture, such as the manufacture of structural composite beam preforms that may be used, for example, in structures such as vehicle chassis, building wall construction, trusses, bridge construction, wall panel construction, boat structures and other structural applications. The structural composite wet out system of the invention provides significant improvements over the state of the art by enabling faster structural composite production run rates, more efficient structural cross sections resulting in lighter weight and more efficient structure, use of a wider variety of resin cure methods leading to the ability to better select resins for use in composite structures, and easier handling of a wetted composite structure immediately after wet-out and/or resin cure.

2. Background of the Invention

Structural composites have been used as components of structures in various structural applications for a number of years. Such applications may provide significant advantages over the use of metal structural elements such as, for example, elimination of corrosion, the ability to form and create specific shapes, weight reduction and the like. Typically, these composite structures, if desired to be formed as a beam or other shape of constant cross section, have been manufactured by a pultrusion process in which a die is utilized to shape and wet the structural component. In a typical pultrusion process, reinforced fibers are pulled through a resin bath in a first impregnation step, which first step may be followed by a second step of passing the wetted, un-cured composite material through a series of custom tooling. This custom tooling helps arrange and organize the fiber into the desired shape, while excess resin is squeezed out, also known as "debulking." This custom tooling may be known as a "pre-former." Often continuous strand mat and surface veils are added in this step to increase structure and surface finish. Once the wetted, resin impregnated fiber is organized and removed of excess resin, the composite may pass through a heated steel die, where the resin undergoes polymerization. The result of the pultrusion process is, generally, a composite structure profile of constant cross section typically comprised of Fiber Reinforced Plastic (FRP). Many pultrusion systems are limited to the use of thermoset resins due to the utilization of heated die to achieve polymerization of the resin.

The pultrusion systems of the prior art may be utilized to produce FRP composite structures of constant longitudinal cross section that may be of a solid cross section, or a cross section that contains voids (or hollow spaces) running lengthwise along the pulling, or longitudinal, axis of the pultruded composite structure. However, it may be desired in many structural applications to create structural members comprising, generally, a structural foam core interior surrounded by an outer reinforcing fabric layer or layers. It may further be desired that the outer reinforcing layers may further be impregnated with a resin, which is typically limited to a theromoset resin. Pultrusion systems are not readily adapted to produce structural foam core interiors surrounded by an outer reinforcing fabric layer or layers. Pultrusion systems are therefore limited in their application in this manner as well. It may also be desired to produce composite panels comprising internal structural members that are oriented transverse to the longitudinal axis of motivation, for example a continuous wall panel with structural members in the transverse direction, which is particularly useful for some applications such as trailers, buildings, shelters and the like. The pultrusion systems of the prior art are not able to produce panel with structural members oriented transversely to the direction of pull (or longitudinal axis of motivation) of the pultrusion as is the present invention.

The pultrusion process is further generally limited to the use of thermoset resins, which is a significant drawback to the use of pultrusion. For example, it may be desired that the particular resin chosen for the fabrication of a composite structural member be chosen based not on its availability as a thermoset resin, but rather on its chemical or structural properties as applied to the anticipated use, load, environment, temperature, expected life and other parameters for the anticipated application. The best choice of resin for any particular use or application may simply not be available as a thermoset resin. This means that there are certain desirable resins, for instance light curable resins, that cannot be used in the pultrusion process and is a distinct disadvantage of the pultrusion systems of the prior art.

Regarding structural foam cores for composite structures, there exist systems and methods in the background art that teach processes and devices for the construction of such un-wetted foam core composite structures. U.S. Pat. No. 5,429,066 to Lewit et al. (hereinafter "the '066 patent") discloses a composite structure and method of manufacturing same. Composite structures manufactured in accordance with the '066 patent have met with substantial commercial success due to their superior structural characteristics and ability to simplify the fabrication of a number of articles such as boats and other reinforced plastic structures which are manufactured using similar techniques.

The composite structure disclosed in the '066 patent is generally comprised of a structural foam core interior surrounded by an outer reinforcing fabric layer. A non-woven fabric layer, such as a mat fiber layer, may be attached to the reinforcing fabric layer. A structural foam is typically, but not necessarily, attached to the non-woven fabric layer on the side of the non-woven fabric layer opposite the reinforcing fabric by filling the interstices (pores) of the non-woven fabric layer.

Structural foams are commonly formed using two or more component parts which are mixed together immediately prior to the time that the foam is to be used. In some instances structural foam may be self-curing. For example, the structural foam may be a two part, self-expanding, self-curing urethane foam. The component parts are generally mixed together, either in a mixing fixture or in a container, prior to use. Subsequently the foam is deposited in a mold and allowed to cure. The component parts typically comprise a blowing agent which is combined with a resin.

One important factor which must be carefully monitored when manufacturing foam core composite structures is the mass ratio of component parts of the structural foam. If the mass ratio is incorrect, the structural integrity, stability, and water resistance characteristics will be undesirably altered. Due to variations in the consistency and viscosity of the constituent foam parts, it is often difficult to ensure consistent mixing of such parts in a proper mass ratio. In the case of composite structures requiring the injection of large amounts of foam in a mold, this does not create a substantial problem because the consistency and viscosity do not vary as much with high flow rates and are averaged out over time.

However, where small amounts of foam are used, foam component ratio variations can create a serious problem. In a continuous foam core production process as described herein, a second factor which must be carefully controlled is the total foam mass injected. If excessive amounts of foam are injected, the foam will have an undesirable tendency to expand through the non-woven fabric layers and into the reinforcing fabric layers when it is used for production of composite structures as described in the '066 patent.

A common type of structure which is fabricated using the techniques described in the '066 patent is an elongated beam or stringer (hereinafter "stringer") which may be formed with various cross-sectional profiles. Such stringers are commonly used as structural elements, for example, in boat construction and as component parts in many other larger fiber reinforced plastic structures which are manufactured using similar techniques. One method of manufacturing such elongated stringers involves use of elongated molds which can be lined with fabric layers as described above. The molds are then injected with structural foam which has been formed by mixing the proper ratio of constituent parts.

Due to the rather time-consuming process of forming stringers using elongated molds, it would be desirable to provide an apparatus capable of continuously producing a length of composite stringer, such as those which are described in the '066 patent. However, in order to manufacture a composite structure in this manner, careful control must be maintained over the instantaneous mass ratio of the component foam parts as well as the total instantaneous mass of foam injected. Particularly in those instances where the cross-sectional profile of the part defines a relatively small area, the rate of foam injection may be too low to ensure that any variations in the mass ratio of the constituent foam parts are averaged out over time.

Moreover, in the case of self-expanding foam of the type used in processes such as that taught in the '066 patent, at least one of the component foam parts is a blowing agent (such as nitrogen and HCFC's) combined with a resin, which must be maintained under pressure prior to use. The resulting component is a foamy, frothy mixture that is difficult to dispense accurately in terms of mass and volume. In fact, equipment of the prior art has generally been found to be capable of providing adequate control over foam component mass ratios only at flow rates above three pounds per minute when using pressurized foam.

It can easily be seen that the pultrusion systems of the background art have significant drawbacks. First, they are slow, with run rates on the order of 2 to 3 inches per minute. Secondly, they typically are limited to heat-cure, or thermoset, resins and do not allow for all types of resin curing; for instance, ultraviolet (UV) cure may not be utilized in some cases due to the pultrusion die covering the resin and also due to the thick cross sections required because the sections a pultruded product are are typically hollow, requiring a thicker wall section than would be required if the beams were filed with a structural foam such as described above. Thus, thirdly, the pultrusion process usually results in thicker, less efficient wall sections than are desired which means the finished structural composite member formed by pultrusion is heavier and more expensive than it needs to be for a given application.

The system and method of the invention described in detail below allows fabrication of a more efficient structural component, especially when the present invention is used with a structural composite preform fabrication system that comprises continuous feed production, by enabling continuous-feed production of composite structures. The composite structures produced by the process and method of the present invention are lighter, of thinner cross section, more rapidly produced, and less costly that structural members produced by the pultrusion systems of the prior art.

BRIEF SUMMARY OF THE INVENTION

The present invention comprises a system and/or method that have one or more of the following features and/or steps, which alone or in any combination may comprise patentable subject matter.

In accordance with one embodiment of the present invention, the composite structure preform wet-out system and method of invention comprises a structural composite wet-out and cure system and method which wets and cures pre-formed composite structure, or structures, which may comprise a structural foam core, by passing these structures through a wetting station which may comprise sprayers, brushes, a die or dies, or other wetting means for applying resin to the composite preform, and also may apply a curing process such as light, which may be ultraviolet light; heat; curing agent or any other method for curing resin known in the art, and presents a completed, cured structural composite beam for use in any structure as desired by the user. The structural composite wet-out and/or cure system of the invention provides run rate, ease of use, efficiency and handling advantages over the pultrusion systems of the prior art.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 6c depicts a cross sectional view, taken in a transverse direction to the longitudinal axis of motivation of the structural composite, of one embodiment of the wetting means of the invention, in which resin is applied to a surface of a structural composite by providing resin to bristles attached to a wetting brush.

FIG. 16a depicts a top view of the production of a panel comprised of a plurality of composite preforms in which the preforms are fabricated by any process known in the art, but is preferably the process taught in U.S. Pat. No. 6,543,469 to Lewit et al.

FIG. 16b depicts a top view of the production of a panel comprised of a plurality of composite preforms in which the preforms are fabricated by any process known in the art, but is preferably the process taught in U.S. Pat. No. 6,543,469 to Lewit et al.

DETAILED DESCRIPTION OF THE INVENTION

Figure 1:
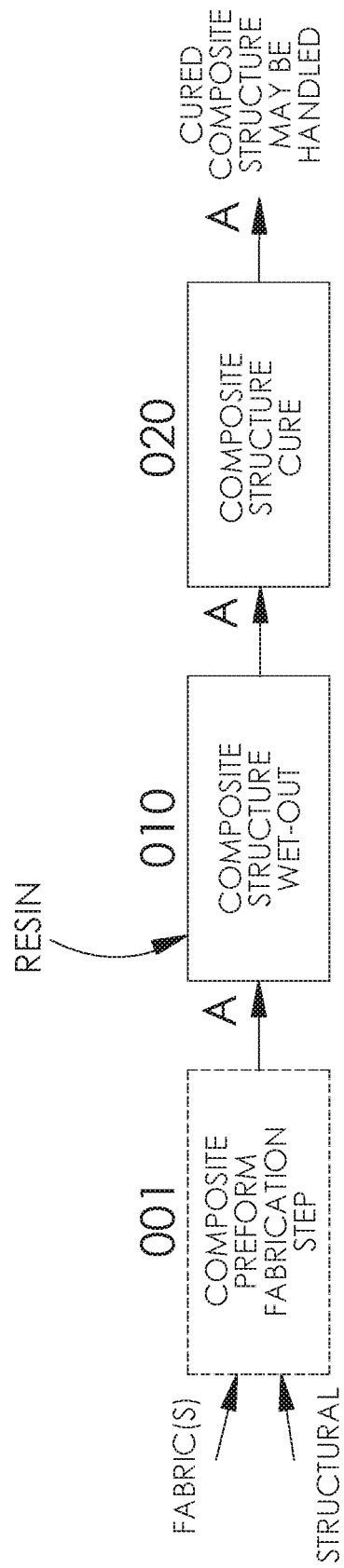
FIG. 1 depicts the basic steps of the structural composite wet-out and cure method of the invention, namely providing a composite structure to be wetted; wetting out the composite structure; and curing the resin on the wetted composite structure.

The following documentation provides a detailed description of the invention.

It is an object of the system and method of the invention to wet composite preforms, preferably on a continuous basis that supports wetting rates allowing for cost effective production of composite structures, for example 16 feet/minute.

It is a further object of the system and method of the invention to cure wetted composite preforms, preferably on a continuous basis that supports wetting rates allowing for cost effective production of composite structures, for example 16 feet/minute.

It is a further object of the system and method to assemble, wet and cure composite structures in the shape of panels, including panels comprised of transverse members that are not aligned with the axis of the panel production line.

As used herein, "unwetted" means any composite structure that has not been impregnated or coated with a resin. "Wetted" means a composite structure that has been impregnated or coated with a resin. "Wet-out" means the process for applying, by impregnating, coating or likewise, a resin to a structure to be wetted. In a fully wetted out, or fully impregnated, composite structure all or nearly all of the fiber filaments are thoroughly saturated with the resin or resin mixture. "Composite structure" means a structure that is comprised of fabric intended to be impregnated with resin, typically but not necessarily surrounding a structural foam core.

"Resin" as used herein means any matrix or other material that is used to coat the fiber layers of a fiber-reinforced composite structure or preform. Such resins include but are not limited to polymers (orthophthalic, isophthalic or otherwise), polyester resins, vinyl ester resins, epoxy resins, phenolic and any other resin known in the art of composite structure manufacture. As used herein, "resins" also includes any resign that is cured or polymerized by application of light (regardless of wavelength), heat, electron beam cure that may utilize, for example, high energy electrons or X rays as ionizing radiation, or any other type of cure. Light cure, as used herein, also means "light-activated", and includes all light curable resins including but not limited to one-part translucent polymers that cure when exposed to a specific light spectrum. When the word "light" is used herein, it refers to light energy of an optical spectrum that is matched to the light curable resin it is being used to cure. "Cure on demand" resins mean any resin that does not self-cure: typically cure on demand resins are cured by application of some external energy such as heat, light, ionizing radiation or any other energy source.

"Fabric" means any fibrous material known in the art of composite structure manufacture, either matt, woven, non-woven, chopped or otherwise, and may comprise fiberglass, carbon fiber, glass fibers, cellulose, polymers, for instance aramid, and the like.

"Fabric layer" means a single or plurality of fabric layers, of any type of fabric in any combination. For instance, "fabric layer" may mean one layer of woven fabric, or may mean a later of woven fabric in conjunction with a layer of non-woven fabric. The system and method of the invention applies to any selection of fabric materials and the number of layers as chosen by the user.

"Structural foam" means any foam material used in the art of composite structure manufacture, and includes, for example and not by way of limitation, polyurethane foam such as a self-expanding self-curing foam. Typically, such a self-rising, self-curing foam is a urethane foam commercially available from BASF, MOBAY, PPG and is typically an MDI-based rigid polyurethane foam (methylene-diphenyl-methane diisocyanate) using "hydrogenated chlorofluorocarbons" (HCFe), water and/or $CO_2$ as a blowing agent.

It is to be understood that the system and method of the invention applies to all types of resins, fabrics, structural foams and combinations thereof, and in fact that this is a distinct advantage of the present invention over the prior art.

The improved structural composite wet-out system of the invention may take as an input any pre-formed structural composite structure, such as, for example, the structural pre-form taught in U.S. Pat. No. 6,543,469, System For Continuously Manufacturing A Composite Preform to Lewit et al., ("the '469 patent"), or a pre-formed structural composite structure formed by the method disclosed and taught in U.S. Pat. No. 5,897,818, Method for Continuously Manufacturing a Composite Preform to Lewit et al., ("the '818 patent"), and applies a novel system and method to wet-out and cure a composite preform in a continuous feed that may operate speeds of 16 feet per minute (fpm or ft/min) or greater.

The '469 patent teaches a system for mixing and dispensing a structural foam formed from two or more component foam parts mixed together in a predetermined mass ratio. At least a first one of said component parts is pre-mixed with a blowing agent and maintained under pressure. The system comprises volumetric flow sensors to measure the rate of flow of each of the component foam parts to be mixed, a feedback loop comprising a digital computer, to determine whether the predetermined mass ratio has been achieved on an instantaneous basis, and at least one gear-type variable flow controller to reduce the flow rate of said first one of the component foam parts to be mixed. The gear-type variable flow controller is adjustable by at least one of an electro-mechanical, hydraulic or electrical type braking device in response to the rate of flow data measured by said volumetric flow sensor.

The wet-out and resin cure system of the present invention provides a system and method for wetting a structural preform, such as, for example, one produced as taught by the '469 patent, in such a manner as to maintain a continuous work flow from fabrication of the structural composite preform into the wetting and curing system of the invention at a rate, for example, of up to 16 ft/min or even greater. This rate is significantly higher than is achievable by traditional pultrusion systems of the prior art and allows for more efficient and economical manufacturing of composite structural beams and the like.

Referring now to FIG. 1, the basic steps of an embodiment of the method of the invention are depicted. In a first composite preform fabrication step 001, an un-wetted composite structure preform is preferably created using a system adapted to produce mass production of composite structural members such as taught in the '469 patent. The '469 patent teaches a continuous preform production process comprising the steps of injecting expanding structural foam into a forming die, which allows the foam to expand to fill the die and which, by virtue of its cross section, causes the expanding foam to take on a desired cross section as determined by the cross section of the die; while applying fabric, which may be woven or non-woven, and may comprise multiple layers of any combination of such fabric, onto the expanded foam which exits the forming die. In this process, a composite preform of uniform cross section comprising a foam core covered by a layer or layers of fabric may be fabricated as a first composite preform fabrication step 001.

In an alternative embodiment of first composite preform fabrication step 001, fabric layers, which may comprise a single layer of fabric or a plurality of layers comprising either woven fabric, non-woven fabric, or a combination of woven and non-woven fabric, may be placed in a mold; self-expanding structural foam may then be applied into the mold such that it penetrates the interstices of the fabric; the mold may be closed while the structural foam expands and/or cures; and then the structural preform may be removed from the mold as taught in U.S. Pat. No. 6,013,213 to Lewit et al. ("the '213 patent"), and also in the '066 patent. Alternatively, the mold may be closed prior to injecting the structural foam, and the structural foam may then be injected into the interior of the mold though an opening in the mold wall or a mechanical fitting capable of allowing the passage of foam into the mold, again as taught in the '213 patent.

In still a further alternate embodiment of first composite preform fabrication step 001, the preform may be created by arranging a fabric or layers of fabric in a configuration constrained against outward movement and defining a cavity between opposing surfaces of the fabric or fabric layers; dispensing a predetermined amount of a self-expanding, self-curable, uncured structural foam into the cavity, the foam expanding and curing in the cavity at a molding pressure determined by the predetermined amount of the foam and thereby attaching itself to the fabric layer to form the composite structure, the molding pressure causing the expanding foam to substantially fill only interstices of an inner portion of the fabric layer, without substantially penetrating an outer portion of the fabric layer; and, freeing the cured composite structure from the constraint of the arranging step, the outer portion of the fabric layer of the composite structure being thereafter substantially completely saturable with a curable material for lamination to another structure in a subsequent processing step. This alternate method for creating a structural preform is taught in U.S. Pat. No. 5,908,591 to Lewit et al.

Figure 2:
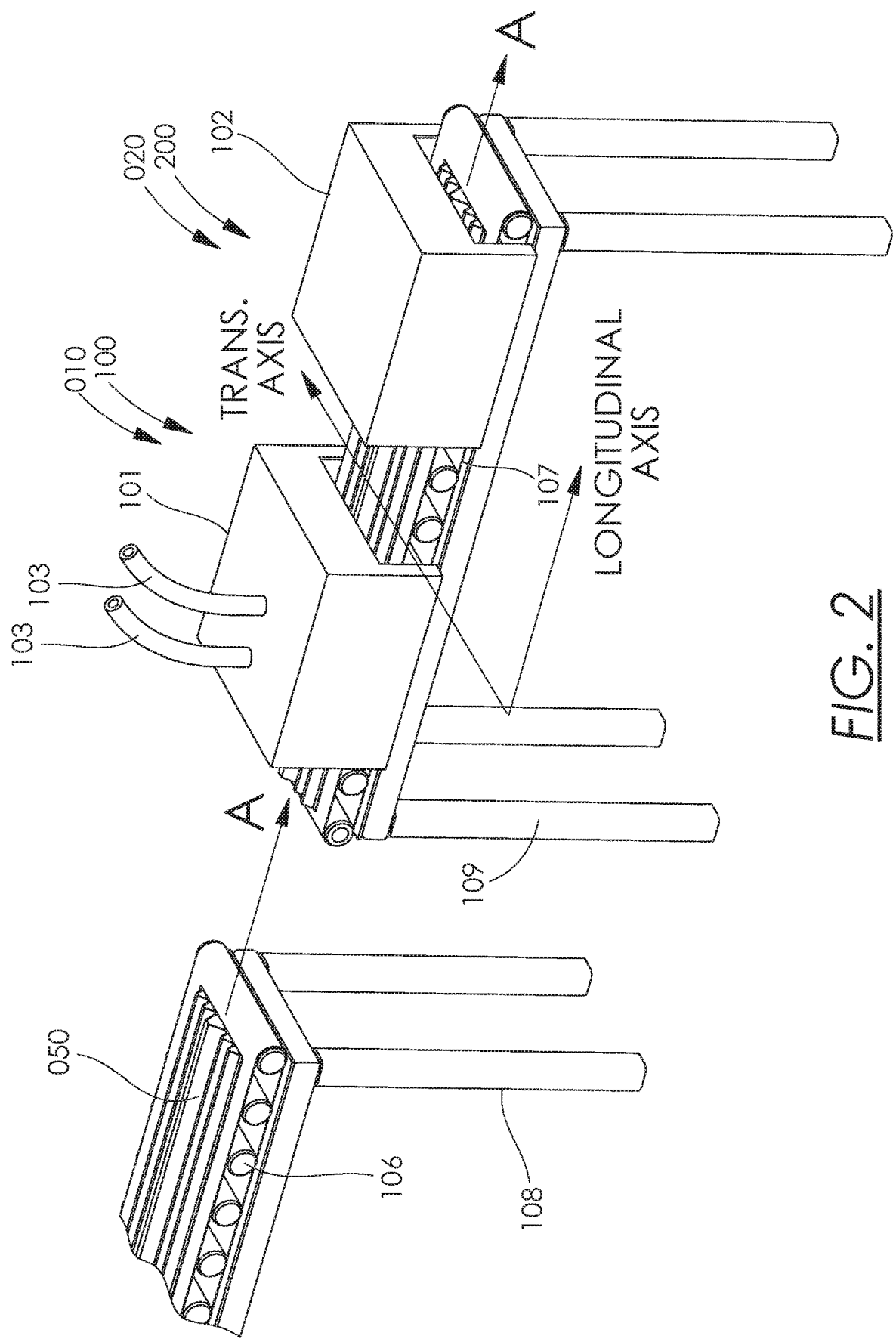
FIG. 2 depicts a perspective view of a preferred embodiment and best mode of the structural composite wet-out and cure method of the invention, depicting a composite structure to be wetted being motivated along a longitudinal axis through the wetting operation and curing operation of the invention.

In still a further embodiment of first composite preform fabrication step 001, any of the above preform fabrication steps, or any other preform fabrication step known in the art, may be followed by the step of placing preform sections at an angle to, or in a transverse direction, to the longitudinal axis of travel of the preforms as they are motivated through the system and/or method of the invention. The longitudinal axis of motivation is depicted in FIG. 1 by arrows A and is also shown in FIG. 2. The placement of structural preforms at an angle to the longitudinal axis of motivation is further depicted in FIG. 4c. It can be seen from referring to FIG. 4c that combined structural preforms comprising longitudinal and transverse members may be created, wetted and cured by the system and method of the invention. Thus the invention is not limited to production of cured structural composite members of uniform cross section, as are prior pultrusion processes, even though a continuous movement of structural composite preforms may be utilized by the system and method of the invention. This is a functional advantage of the present system and method of the invention over the prior art.

In still a further embodiment of first composite preform fabrication step 001, a foam core may be shaped by any means known in the art, and fiber layers may be wrapped on the foam core, producing a composite preform.

Still referring to FIG. 1, first composite preform fabrication step 001 may be followed by composite preform wet-out step 010, in which resin is applied to the structural preform as is taught herein. In this step, resin may be applied to the fabric covering the composite preform by any means known in the art including but not limited to spraying, brushing, by applying resin through channels and orifices in a mechanical wetting die such that the resin is applied to the fabric covering the structural preform, or by another means known for applying resin to a structural preform.

Still referring to FIG. 1, composite preform wet-out step 010 may be followed by composite preform cure step 020, in which the applied resin is cured, or at least partially cured, by the system and method of the invention. In this step, the resin may be cured by application of heat, such as is the case, for example, when a thermoset resin is utilized, by ultraviolet or other frequency of light such as is the case, for example, when light-curable resin is utilized, by ionizing radiation such as electron beam radiation, or by any other means known in the art for the curing of resin.

After the processing of the composite structural preform through the steps of composite preform fabrication step 001, composite preform wet-out step 010, and composite preform cure step 020, the cured or partially cured structural composite member may be handled for packaging, storage, shipping, assembly in to a structure such as a boat, trailer, or other structure, as desired by the user.

Referring now to FIG. 2, a preferred embodiment and best mode of the structural composite preform wet-out and curing system of the invention is depicted. Composite preforms 050 of any cross section to be wetted and/or cured may be motivated along longitudinal axis A in the direction depicted by arrow A in FIG. 2 by operation of a conveyor, or a plurality of conveyors. Any number of conveyors may be utilized by the invention. For ease of reference in the figures, the invention is depicted as comprising a first conveyor 106 and a second conveyor 107 but it is to be understood and appreciated that the system of the invention may utilize any number or type of conveyor known in the art for motivation work product in a manufacturing environment. Typically each conveyor is driven by an electric motor that may, for instance, be in electrical communication with a computer which may contain a computer program stored in non-transitory computer readable memory that contains instructions for controlling the conveyor motor speed. Each conveyor may operate at the same speed as selected by the user of the system by directly adjusting the speed of the conveyor motor or motors, or by utilizing the computer program to set the speed of the conveyor motor or motors.

A typical conveyor speed, for instance, is 16 feet/minute. The speed of the conveyor(s) may therefore be adjustable as desired by the user: for instance the user may decide to select a speed that causes the wetted composite preform to traverse curing station 200 over a specific period of time in order to provide appropriate curing of the resin. In such cases, the user may consider the curing properties of the resin, the amount of resin that is being applied to the composite preform in wetting station 100, and the type and intensity of curing applied in the curing station in order to arrive at a desired cure level of the composite preform as it exits curing station 200. Each conveyor may rest upon a support structure such as first support structure 108 and second support structure 109 as depicted in FIG. 2. However, as in the case with the depiction of the conveyors, the invention may comprise any number of support structures, and the structures may take any configuration desired by the user. The figures depict a first support structure 108 and a second support structure 109 for ease of reference only.

Still referring to FIG. 2, it may be seen that a composite preform may be motivated along a longitudinal axis of motivation A through composite preform wet-out step 010, which may, but does not necessarily, take place in wetting enclosure 101, and through composite preform curing step 020, which may, but does not necessarily, take place in curing enclosure 102. Once the composite preform has been wetted and cured, or partially cured, it exits curing enclosure 102 whereupon it may further handled or processed as desired by the user. Transverse direction B, which is transverse to the longitudinal axis of motivation A, is shown for reference in FIG. 2.

Still referring to FIG. 2, resin conduction means 103 which may be tubing, piping, flexible hose, rigid or semi-rigid hose, or any other means or structure as may be known in the art for transporting resin, may be utilized to conduct resin to the wetting apparatus, or apparatuses, of wetting station 100. Resin conduction means 103 may be attached to a resin reservoir through a resin pump, which resin pump may controllable by a controlling means in order to control the rate of delivery of resin through resin conduction means 103. One embodiment of resin pump controlling means is, for example, a control such as rheostat directly connected between resin pump and the source of electrical supply for the resin pump, by which the pump rate of the resin pump may be directly controllable. Alternatively, the resin pump may be controlled by a computer in electrical communication with the resin pump, and wherein the computer may contain a computer program stored in non-transitory computer readable memory which may contain instructions for controlling the pump rate of the resin pump based on inputs into the computer by a user. In this manner a user may directly control the resin flow rate to the resin application means of the wetting station.

Figure 3A:
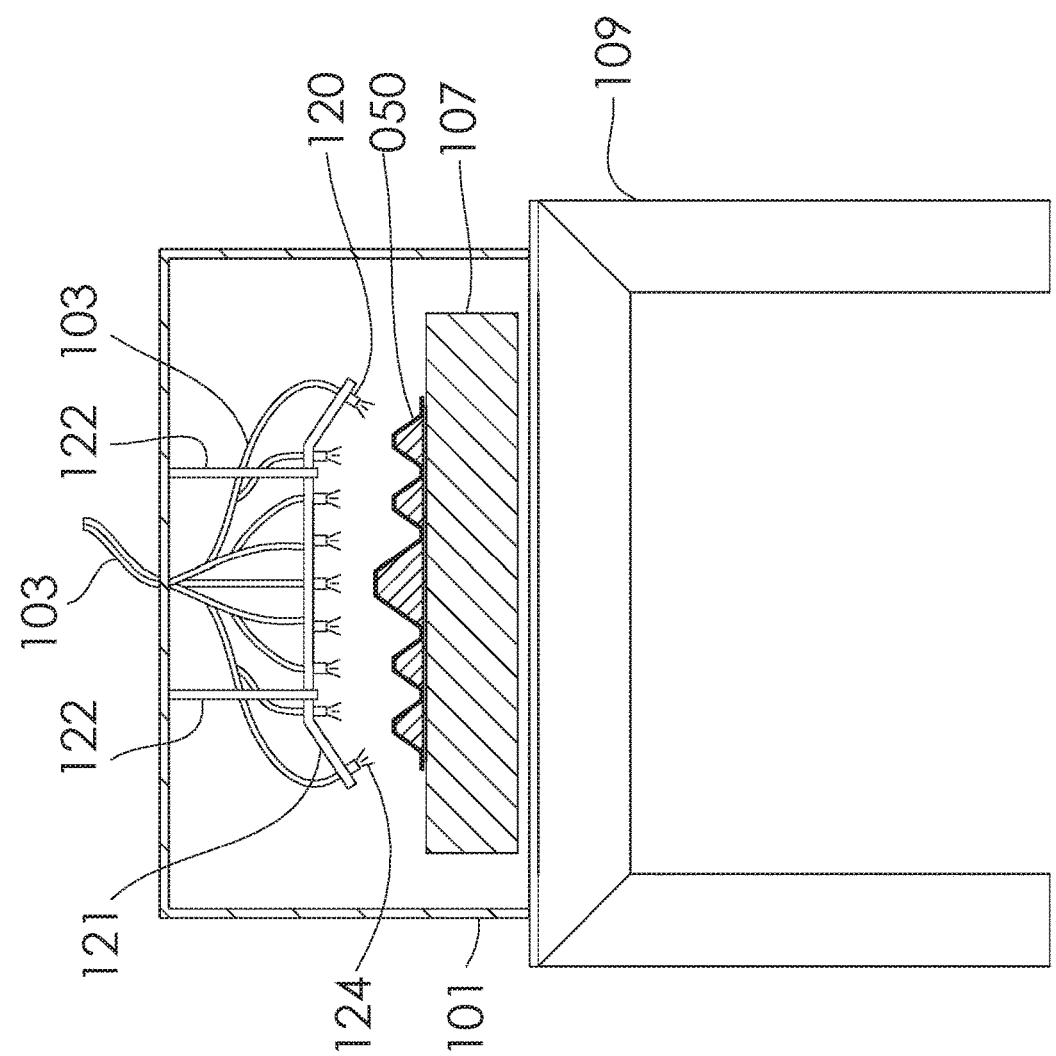
FIG. 3a depicts a cross sectional view, taken in a transverse direction to the longitudinal axis of motivation of the structural composite, of one embodiment of the wetting means of the invention, in which resin is applied to a surface of a structural composite by spraying.

Referring now to FIG. 3a, a cross section taken transverse to the longitudinal axis of motivation A (not depicted in FIG. 3a but depicted in FIG. 2) is depicted in which a typical composite preform 050 is shown in cross section in wetting station 100 where wetting of composite preform 050 is achieved by spraying resin onto the preform. Composite preform 050 may reside upon conveyor 107, which may be one or any number of conveyors, and is motivated along the longitudinal axis of motivation A by operation of conveyor 107. As composite preform 050 is thus motivated, resin may be applied to its outer surfaces as desired by spraying resin through spray heads 120, which may be retained in resin spray head bracket or other mechanical fixture 121. The number and orientation of spray heads 120 may be selected and positioned as desired by the use to achieve a desired application of sprayed resin onto composite preform as it traverses wetting station 100. Resin conduction means 103 may enter wetting station enclosure 101 on a top surface thereof as indicated in FIG. 2, or may enter through any side or surface of wetting station 101 as may be desired by the user. The depiction of the entrance of resin conduction means 103 through a top surface of wetting station enclosure 101 is but one of many embodiments within the scope of the invention and is shown for convenience only. Resin spray head support bracket 122 may be attached to wetting station enclosure 101 by any means known in the mechanical arts such as threaded fasteners, welding, brazing or any means known in the art for attaching one structure to another. Likewise resin spray head bracket or other mechanical fixture 121 may be attached to resin spray head support bracket 122 by any means known in the mechanical arts such as threaded fasteners, welding, brazing or any means known in the art for attaching one structure to another. It can easily be seen that resin spray 124 from resin spray heads 120 may be applied to the desired surfaces of the composite preform in any amount or at any speed desired by the user. The user may also control the area to be sprayed by selecting the number of resin spray heads 120, and by configuring any support structure supporting resin spray heads 120 such as resin spray head bracket 121 such that resin is applied only to the desired area or areas of composite preform 050 as it is motivated through and traverses wetting station 100.

Figure 3B:
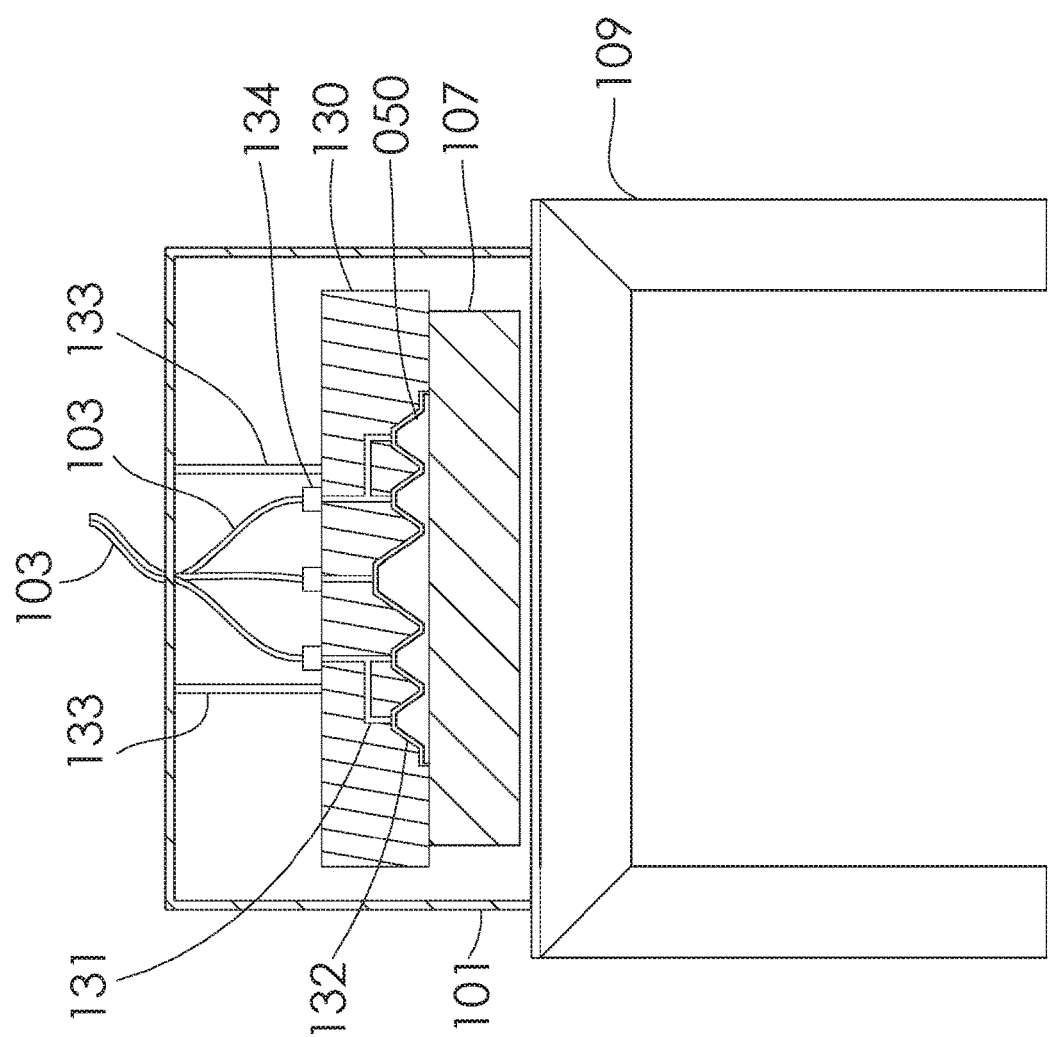
FIG. 3b depicts a cross sectional view, taken in a transverse direction to the longitudinal axis of motivation of the structural composite, of one embodiment of the wetting means of the invention, in which resin is applied to a surface of a composite preform by providing resin through channels in a wetting die.

Referring now to FIG. 3b, a cross section taken transverse to the longitudinal axis of motivation A (not depicted in FIG. 3b but depicted in FIG. 2) is depicted in which a typical composite preform 050 is shown in cross section in wetting station 100 in which a wetting die 130 is utilized to apply resin to the composite preform 050. Wetting die 130 may be fabricated from any material suitable for being in contact with resin, including but not limited to steel or other metal. Composite preform 050 may reside upon conveyor 107, which may be one or any number of conveyors, and is motivated along the longitudinal axis of motivation A by operation of conveyor 107 which may reside on second support structure 109. As composite preform 050 is thus motivated, resin may be applied to its outer surfaces as desired by forcing resin through die channels 131, which may be formed in wetting die 130 and which may be of any cross section, but which provide a channel by which resin may be forced through the channels and into the space 132 between the die and the surface of composite preform 050 to be wetted. The number and orientation of channels 131 in wetting die 130 may be selected and positioned as desired by the use to achieve a desired application of resin onto composite preform 050 as it traverses wetting station 100. Resin conduction means 103 may enter wetting station enclosure 101 on a top surface thereof as indicated in FIG. 2, or may enter through any side or surface of wetting station 101 as may be desired by the user. The depiction of the entrance of resin conduction means 103 through a top surface of wetting station enclosure 101 is but one of many embodiments within the scope of the invention and is shown for convenience only. Wetting die supports 133 may be attached to wetting station enclosure 101 by any means known in the mechanical arts such as threaded fasteners, welding, brazing or any means known in the art for attaching one structure to another. Likewise wetting die 130 may be attached to wetting die supports 133 by any means known in the mechanical arts such as threaded fasteners, welding, brazing or any means known in the art for attaching one structure to another. It can easily be seen that resin may be forced through die channels 131 such that resin may be applied to the desired surfaces of the composite preform in any amount or at any speed desired by the user. The user may also control the area to be wetted by configuring wetting die 130 and die channels 131 such that resin is applied only to the desired area or areas of composite preform 050 as it is motivated through and traverses wetting station 100. Preferably, but not necessarily, wetting die 130 is configured to be conformal to the cross section of the composite preform as is shown in FIG. 3b. It is important to note that the composite preform cross section depicted in FIG. 3b is representative only, and that the preform may be of any desired cross section.

Figure 3C:
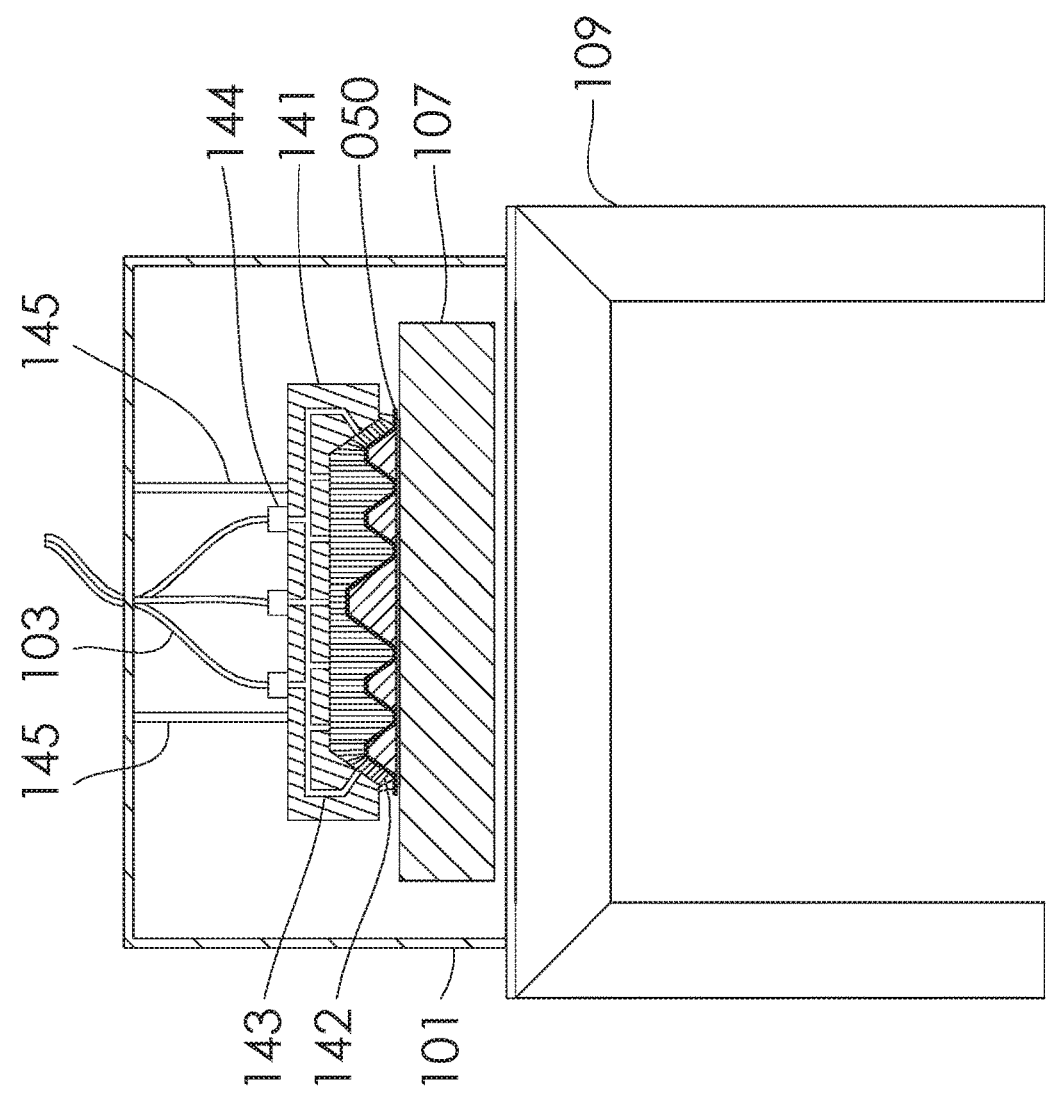
FIG. 3c depicts a cross sectional view, taken in a transverse direction to the longitudinal axis of motivation of the structural composite, of one embodiment of the wetting means of the invention, in which resin is applied to a surface of a composite preform by providing resin through channels to bristles attached to a wetting brush.

Referring now to FIG. 3c, a cross section taken transverse to the longitudinal axis of motivation A (not depicted in FIG. 3c but depicted in FIG. 2) is depicted in which a typical composite preform 050 is shown in cross section in wetting station 100 in which a wetting brush assembly 140 is utilized to apply resin to the composite preform 050. Composite preform 050 may reside upon conveyor 107, which may be one or any number of conveyors, and is motivated along the longitudinal axis of motivation A by operation of conveyor 107 which may reside on second support structure 109. As composite preform 050 is thus motivated, resin may be applied to its outer surfaces as desired by forcing resin through wetting brush channels 143, which may be formed in wetting brush body 141 and which may be of any cross section, but which provide a opening by which resin may be forced through wetting brush channels 143 and into the wetting brush bristles 142, which enables resin to flow along wetting brush bristles 142 as they are swept across the surface to be wetted of composite preform 050, applying resin to composite preform 050 as desired by the user. Wetting brush body 141 may be fabricated from any material suitable for being in contact with resin, including but not limited to steel or other metal. Wetting brush bristles 142 may be captured in wetting brush body by any means known in the art including chemical bolding or press fit, or any other means. Wetting brush bristles 142 may be of any material suitable for spreading resin, including but not limited to nylon or any other brush material known in the art. The number and orientation of wetting brush channels 143 in wetting brush body 141 may be selected and positioned as desired by the use to achieve a desired application of resin onto composite preform 050 as it traverses wetting station 100. There may be one or a plurality of wetting brush channels 143 in wetting brush body 141. Resin conduction means 103 may enter wetting station enclosure 101 on a top surface thereof as indicated in FIG. 2, or may enter through any side or surface of wetting station 101 as may be desired by the user. Resin conduction means 103 may be in fluid communication with wetting brush channels 143 through wetting brush adapters 144. The depiction of the entrance of resin conduction means 103 through a top surface of wetting station enclosure 101 is but one of many embodiments within the scope of the invention and is shown for convenience only. Wetting brush assembly supports 145 may be attached to wetting station enclosure 101 by any means known in the mechanical arts such as threaded fasteners, welding, brazing or any means known in the art for attaching one structure to another. Likewise wetting brush assembly 140 may be attached to wetting brush assembly supports 145 by any means known in the mechanical arts such as threaded fasteners, welding, brazing or any means known in the art for attaching one structure to another. It can easily be seen that resin may be forced through wetting brush channels 143 and through wetting brush bristles 142 onto the surface to be wetted of composite preform 050 such that resin may be applied to the desired surfaces of the composite preform in any amount or at any speed desired by the user. The user may also control the area to be wetted by configuring wetting brush body 141 and wetting die channels 143 such that resin is applied only to the desired area or areas of composite preform 050 as it is motivated through and traverses wetting station 100. Preferably, but not necessarily, wetting brush body 141 and wetting brush bristles are configured to be conformal to the cross section of the composite preform as is shown in FIG. 3c. It is important to notes that the composite preform cross section depicted in FIG. 3c is representative only, and that the preform may be of any desired cross section.

Figure 4A:
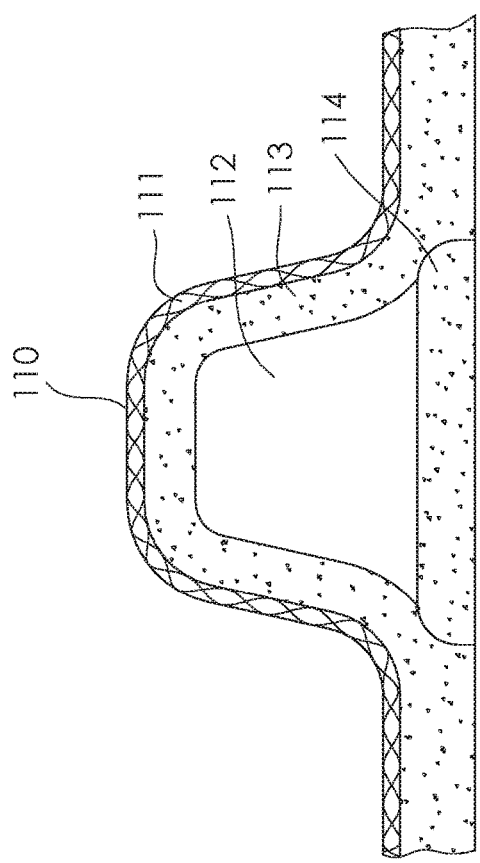
FIG. 4a depicts a cross section view, taken in a transverse direction to the longitudinal axis of motivation of the structural composite, of one of many embodiments of a composite preform that may be wetted and/or cured by the invention, in which fabric covers a structural foam core.
Figure 4B:
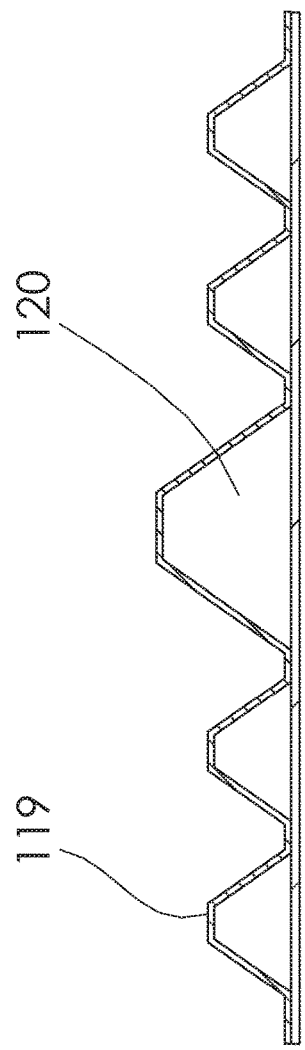
FIG. 4b depicts a cross section view of one of many embodiments of a structural composite that may be wetted and/or cured by the invention, the view being taken in a transverse direction to the longitudinal axis of motivation of the composite preform, and illustrating that complex cross sectional shapes may be wetted and/or cured by the invention.

Referring now to FIGS. 4a and 4b, a cross-sectional view of a structural preform as produced by the method of the '469 patent and that may be used in the system of the invention is depicted. Structural foam 112, such as expanding self-curing urethane foam, may be covered by a non-woven layer 113 and a reinforcing fiber layer 111. In wetting a composite preform it is desirable to saturate non-woven layer 113 and a reinforcing fiber layer 112 with resin. In the example shown, a substantially typical structural cross-section is shown (FIG. 4a) and a more complex cross-sectional composite preform is shown (FIG. 4b). It is to be noted that the wetting system of the invention is adaptable to any preform cross-sectional shape including but not limited to square, triangular, round, elliptical, complex, or shapes that comprise a plurality of such cross sections. Likewise, the system and method and of the invention may be used to wet and cure any composite preform without regard to the presence or type of foam core, and without regard to the composite of the fiber layer. The examples shown in FIGS. 4a and 4b are for representative exemplary illustration.

Figure 4C:
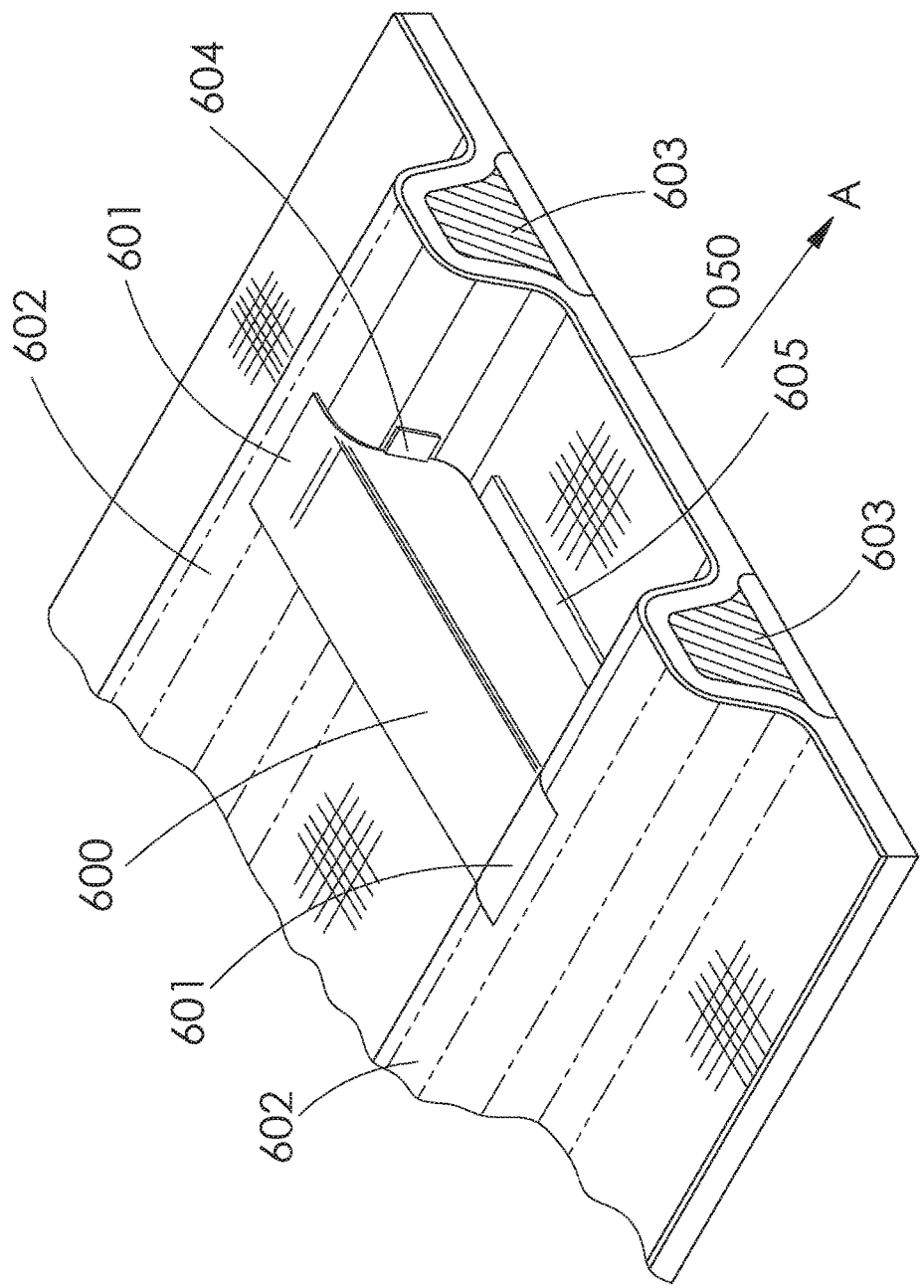
FIG. 4c depicts a perspective view of one of many embodiments of a structural composite that may be wetted and/or cured by the invention, in which the composite preform contains structural members that are not aligned with the longitudinal axis of motivation and therefore the preform is of non-uniform or non-constant cross section.

Referring now to FIG. 4c, the system of the invention may also be utilized to wet out and cure composite preforms that are not of constant cross-section, such as the composite preform 050 shown in FIG. 4c. It can be seen from FIG. 4c that cross member 600 may be fabricated and positioned at an angle to, or transverse two, the longitudinal axis of motivation A prior to composite preformed wet-out step 010. In many structural applications, it may be desirable that the structure comprise members, such as cross member 600, which are not aligned with the longitudinal axis of motivation A the ability of the system and method of the invention to accommodate composite preforms of non-constant or non-uniform cross-section is a significant advancement in advantage over the pultrusion systems the prior art. It should be noted that cross member 600 may take any cross-sectional shape in the placed at any angle to the longitudinal axis of motivation A as desired by the user. The cross-section, orientation and placement of cross-member 600 depicted in FIG. 4c is exemplary only and is but one of many embodiments of composite preforms having non-uniform or non-constant cross section. Structural foam may occupy spaces 603 as depicted. Cross member 600 may be hollow or may be filled with structural foam as the user desires. Fabric flaps 601, 604 and 605 may rest upon fabric forming a covering layer of composite preform 050 such that when wetted, resin saturates fabric flaps 601, 604 and 605 as well as the fabric covering of composite preform 050. As the resin is cured during composite preform cure step 020, a unitary composite structure is created and flaps 601, 604 and 605 become bonded to and a part of composite preform 050 forming a structural cross member. Raised structural members 602 are shown as an example of one of any number of possible shapes that may comprise composite preform 050; the system and method of the invention are operable with composite preforms 050 of any cross sectional shape, and with transverse member such as 600. In this manner the system of the invention may be utilized to produce composite structures of non-uniform cross-section containing cross members running at an angle to or transverse to longitudinal axis of motivation A.

Figure 5A:
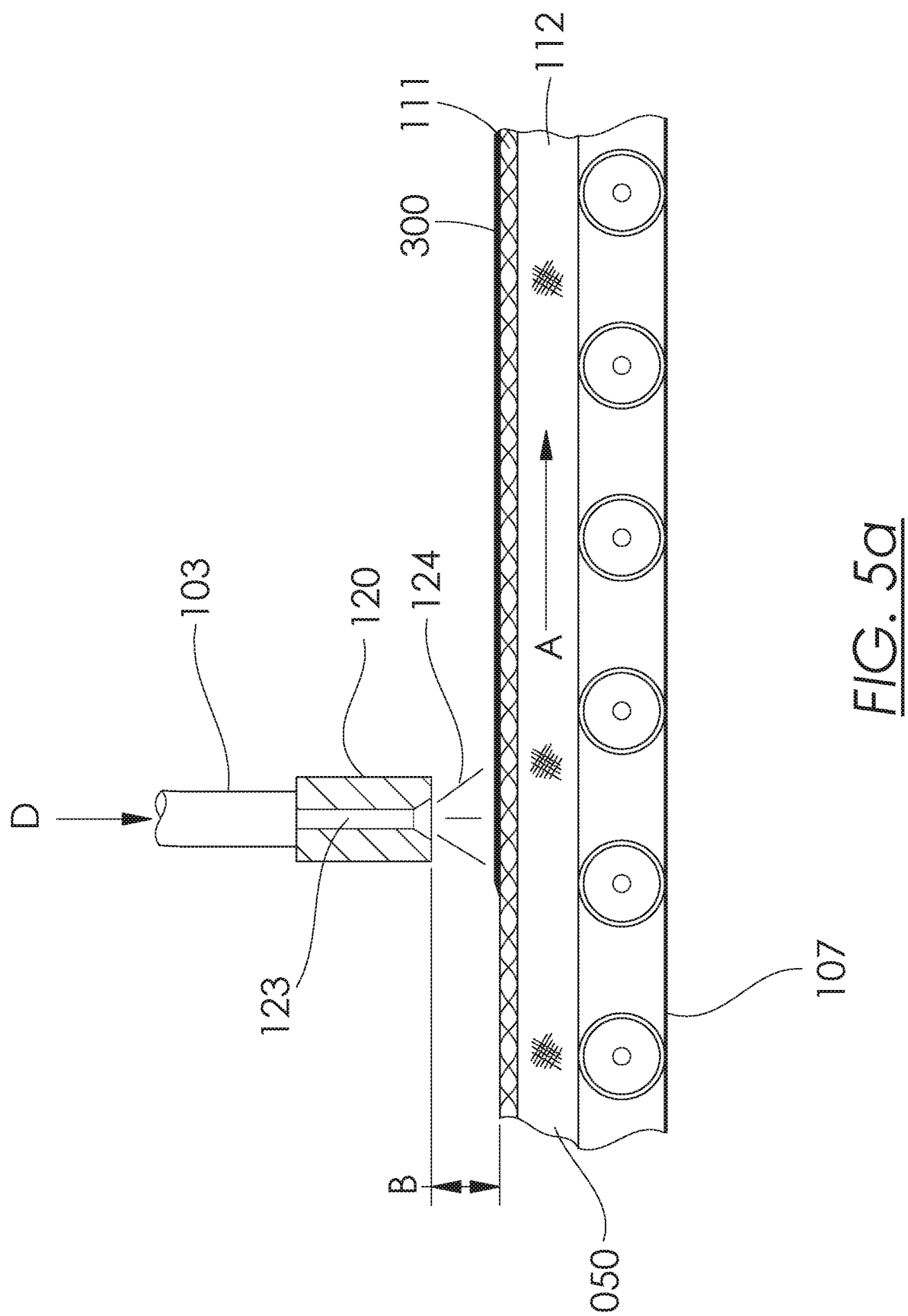
FIG. 5a depicts a cross section view taken along the longitudinal axis of motivation of the structural composite in which in which resin is applied to a surface of a structural composite by spraying.

Referring now to FIG. 5a, a more detailed view of one embodiment of the invention depicting of the application of resin by spraying is depicted. A cross section view taken along the longitudinal axis of motivation of the composite preform 050 in which resin is applied to a surface of a composite preform 050 by spraying is depicted. Composite preform 050 comprised of a structural foam core 302 and a fabric layer 301, which may be fabricated by any method known in the art including but not limited to the methods disclosed in the '469 and '818 patents, is attached thereto by any of the methods hereinbefore mentioned or as known in the art is motivated in the longitudinal axis of motivation A. A conveyor 107 may be utilized to motivate structural preform 050 in direction A. As composite preform 050 is motivated in direction A, resin is applied to structural preform 050 by spraying resin 124 through resin spray head 120 which comprises resin spray head channel 123 for communicating resin from resin conduction means 103, through channel 123 in resin spray head 120, and onto the surface to be wetted of composite preform 050. Resin spray head 120 may be fabricated from any material suitable for being in contact with resin, including but not limited to steel or other metal. The resulting resin impregnation 114 of fabric layer or layers 301 provides the desired wetting of the composite preform 050, and from wetting station 100 the wetted composite preform may be motivated to curing station 200 of the invention or other process as desired by the user using, for example, the conveyors depicted in the drawings. Resin spray head 120 may be set away from the surface to be wetted by a distance B which may be selected by the user as required to achieve the desired wetting amount of fabric layer 301 of composite preform 050. Resin is communicated into resin spray head 120 through resin communication means 103; arrow D depicts the direction of resin flow through resin communication means 103.

Figure 5B:
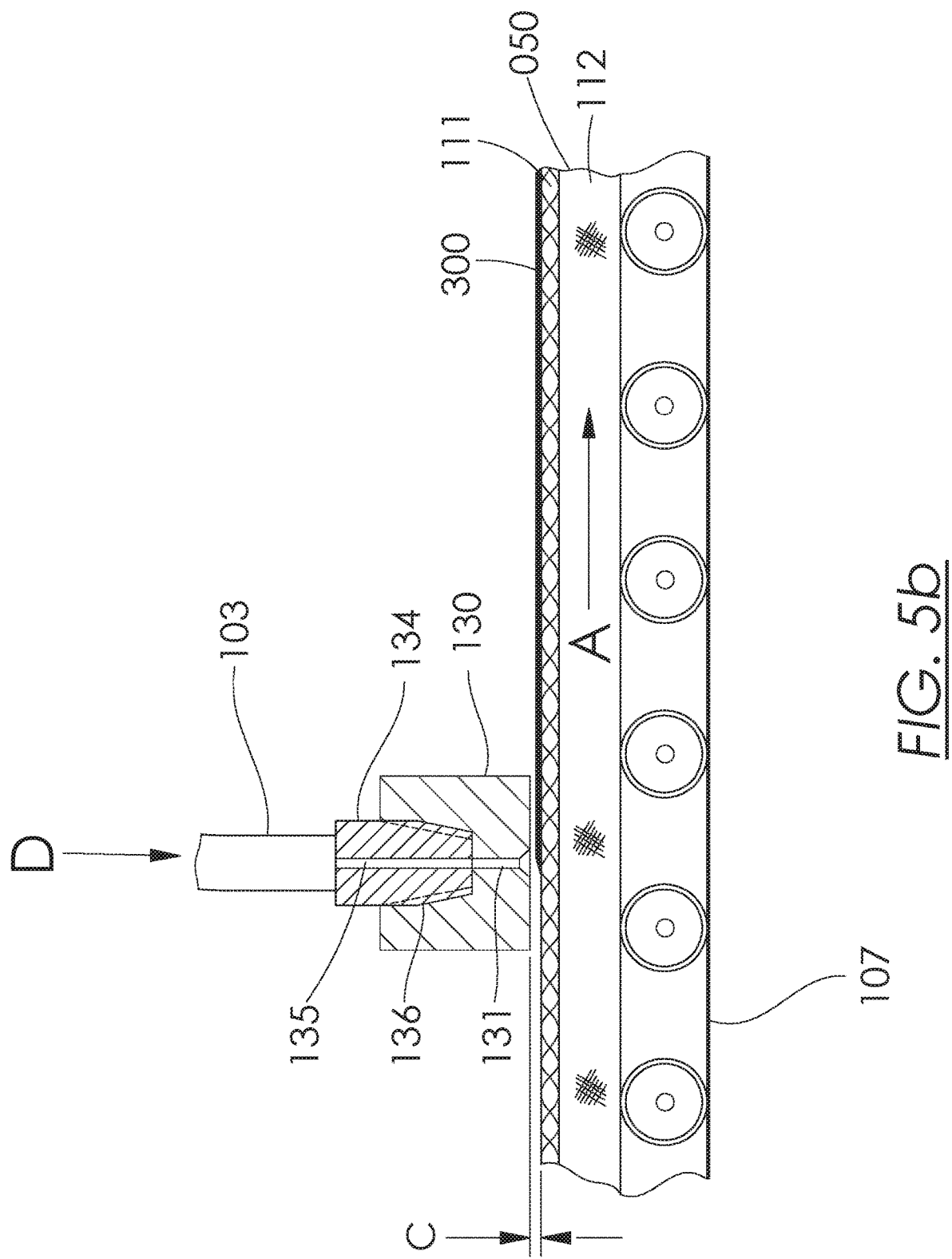
FIG. 5b depicts a cross section view taken along the longitudinal axis of motivation of the structural composite in which in which resin is applied to a surface of a structural composite by providing resin through channels in a wetting die.

Referring now to FIG. 5b, a more detailed view of one embodiment of the invention depicting the application of resin by using wetting die 130 is depicted. A cross section view taken along the longitudinal axis of motivation of the structural composite 050 in which in which resin is applied to a surface of a structural composite by providing resin through channels in a wetting die is depicted. A structural preform 050 comprised of a structural foam core 302 and a fabric layer 301 attached thereto by any of the methods hereinbefore mentioned or as known in the art is motivated in the longitudinal axis of motivation A. A conveyor 107 may be utilized to motivate structural preform 050 in direction A. As structural preform 050 is motivated in direction A, resin is applied to structural preform 050 by forcing resin through die channels 131 which are channels for communicating resin from resin conduction means 103, through die channels 131 in wetting die 130, and onto the surface to be wetted of composite preform 050. The resulting resin impregnation 114 of fabric layer 301 provides the desired wetting of the composite preform 050, and from wetting station 100 the wetted composite preform may be motivated to the curing station 200 of the invention or other process as desired by the user. Wetting die 130 may be set away from the surface to be wetted by a distance C which may be selected by the user as required to achieve the desired wetting amount of fabric layer 301 of composite preform 050. Resin may be communicated into wetting die adapter 134 through resin communication means 103; arrow D depicts the direction of resin flow through resin communication means 103. Wetting die adapter 134 may contain wetting die adapter channel 135, and may further comprise wetting die adapter male threads 136 which may be threadingly engaged with matching female threads in wetting die 130 such that resin is communicated into wetting die adapter 134 from resin communication means 103 in direction of flow D. When wetting die adapter 134 is threadingly engaged with matching threads in wetting die 130, die channel 131 may align with wetting die adapter channel 135 such that resin may flow from resin communication means 103 through wetting die adapter channel 135 and then through die channel 131 and onto the composite preform, wetting the fabric layer 301 of composite preform 050 and leaving a layer of resin 114 on fabric layer 301.

Figure 5C:
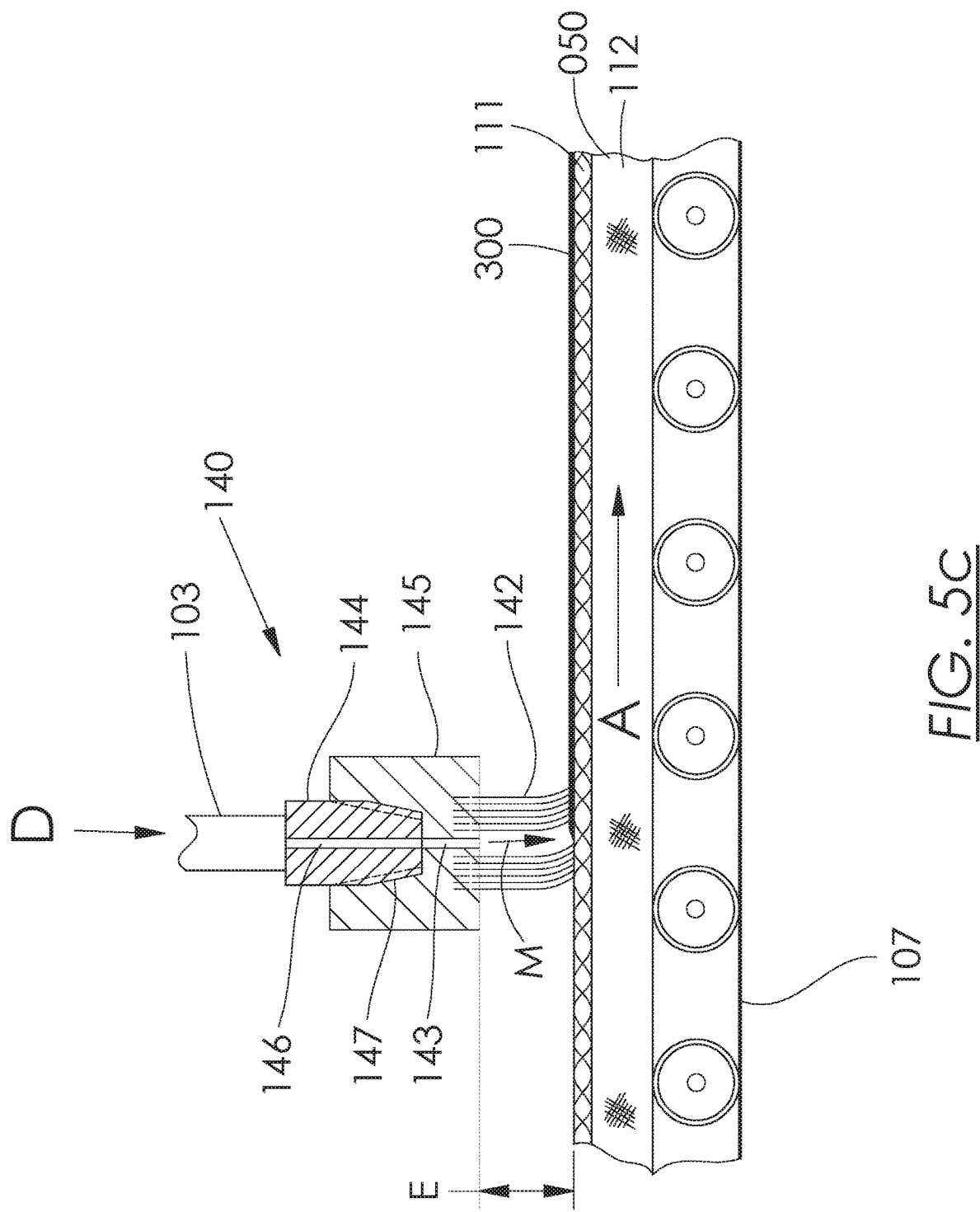
FIG. 5c depicts a cross section view taken along the longitudinal axis of motivation of the structural composite in which in which resin is applied to a surface of a structural composite by providing resin through channels to bristles attached to a wetting brush.

Referring now to FIG. 5c, a more detailed view of one embodiment of the invention depicting the application of resin by using brush assembly 140 is depicted. A cross section view taken along the longitudinal axis of motivation of the structural composite 050 in which in which resin is applied to a surface of a structural composite by providing resin through channels to bristles attached to a wetting brush is depicted. A composite preform 050 comprised of a structural foam core 112 and a fabric layer 111 attached thereto by any of the methods hereinbefore mentioned or as known in the art is motivated in the longitudinal axis of motivation A. A conveyor 107 may be utilized to motivate composite preform 050 in direction A. As composite preform 050 is motivated in direction A, resin is applied to structural preform 050 by forcing resin through wetting brush channels 143 which are channels for communicating resin from resin conduction means 103, through wetting brush channels 143 in wetting brush body 141, and onto the surface to be wetted of composite preform 050. The path of resin dispensing from wetting brush channels 143 through brush bristles 142 is depicted by arrow M. The resulting resin impregnation 114 of fabric layer 111 provides the desired wetting of the fabric layer(s) 111 of composite preform 050, and from wetting station 100 the wetted composite preform may be motivated to the curing station 200 of the invention or other process as desired by the user. Wetting brush body 140 may be set away from the surface to be wetted by a distance E which may be selected by the user as required to achieve the desired wetting amount of fabric layer 301 of composite preform 050. Resin may be communicated into wetting brush adapter 144 through resin communication means 103; arrow D depicts the direction of resin flow through resin communication means 103. Wetting brush adapter 144 may contain wetting brush adapter channel 146, and may further comprise wetting brush adapter male threads 147 which may be threadingly engaged with matching female threads in wetting brush body 141 such that resin is communicated into wetting brush adapter 144 from resin conduction means 103 in direction of flow D. When wetting brush adapter 144 is threadingly engaged with matching threads in wetting die 130, wetting brush channel 143 may align with wetting brush adapter channel 146 such that resin may flow from resin communication means 103 through wetting brush adapter channel 146 and then through wetting brush channel 143 and onto the composite preform, wetting the fabric layer 301 of composite preform 050 and leaving a layer of resin 114 on fabric layer 301. Wetting brush bristles 142 may be attached to wetting brush body 141 by any means known in the mechanical arts for bristle attachment to a brush. In one embodiment, wetting brush bristles 142 may reside in a hole or plurality of holes, or cavities, in wetting brush body 141 and may further be attached by chemical bonding to wetting brush body 141 by any adhesive, epoxy, or chemical bonding agent.

Figure 6A:
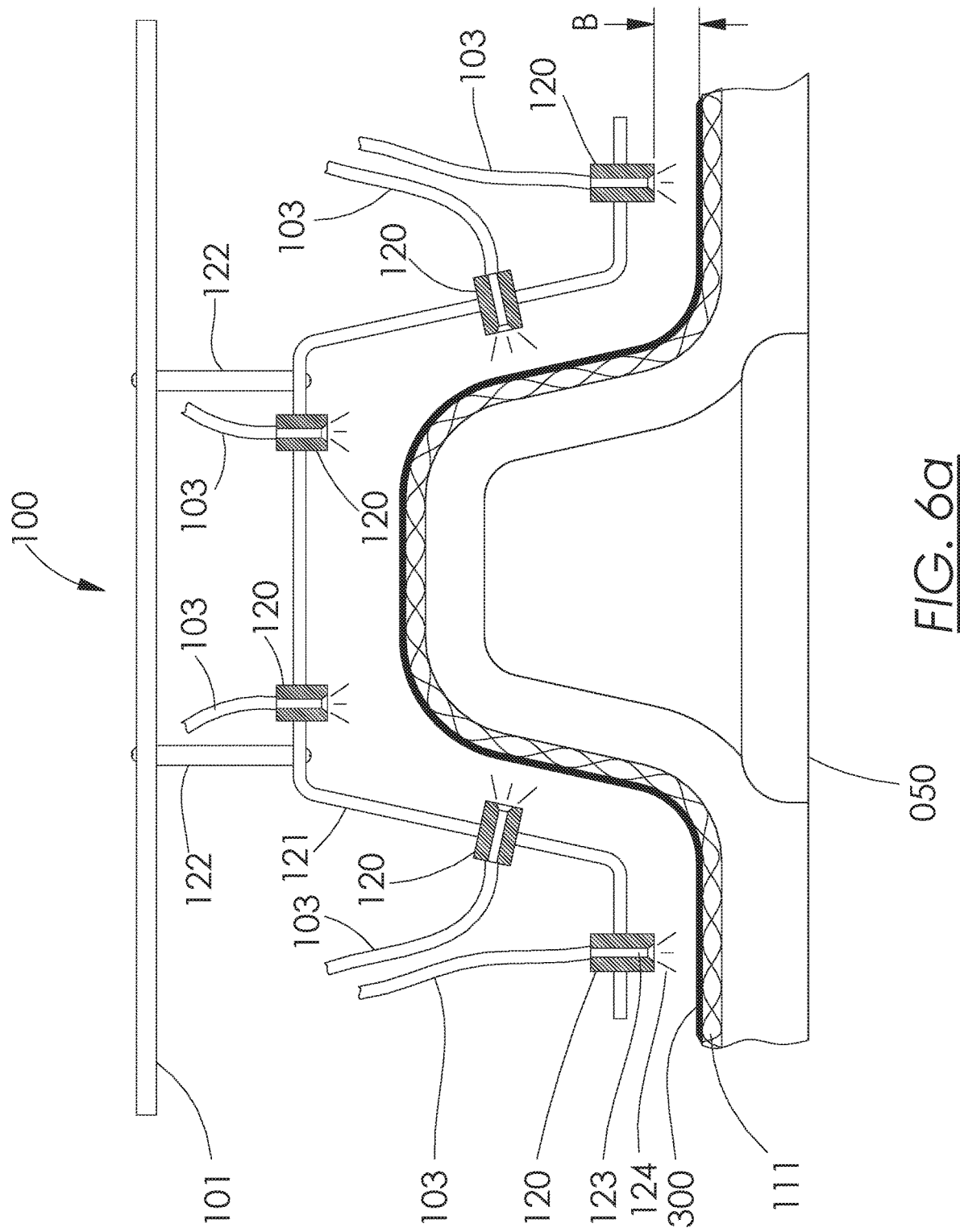
FIG. 6a depicts a cross sectional view, taken in a transverse direction to the longitudinal axis of motivation of the structural composite, of one embodiment of the wetting means of the invention, in which resin is applied to a surface of a structural composite by spraying.

Referring now to FIG. 6a, a more detailed view of one embodiment of the invention depicting of the application of resin by spraying is depicted. A cross sectional view, taken in a transverse direction to the longitudinal axis of motivation of the structural composite, of one embodiment of the wetting means of the invention, namely a sprayer, in which resin is applied to a surface of a structural composite. A structural preform 050 comprised of a structural foam core and a fabric layer 301 attached thereto by any of the methods hereinbefore mentioned or as known in the art is motivated in the longitudinal axis of motivation A (not shown in FIG. 6a but depicted in FIG. 5a). As structural preform 050 is motivated in direction A, resin is applied to structural preform 050 by spraying resin 124 through at least one resin spray head 120 which contains resin spray head channel 123 for communicating resin from resin conduction means 103, through channel 123 in resin spray head 120, and onto the surface to be wetted of composite preform 050. The resulting resin impregnation 114 of fabric layer 111 provides the desired wetting of the composite preform 050, and from wetting station 100 the wetted composite preform may be motivated to the curing station 200 of the invention or other process as desired by the user. Resin spray head 120 may be set away from the surface to be wetted by a distance B which may be selected by the user as required to achieve the desired wetting amount of fabric layer 111 of composite preform 050. Resin is communicated into resin spray head 120 through resin communication means 103. Resin spray head bracket 121 supports resin spray heads 120 and is mounted to wetting enclosure 102.

Figure 6B:
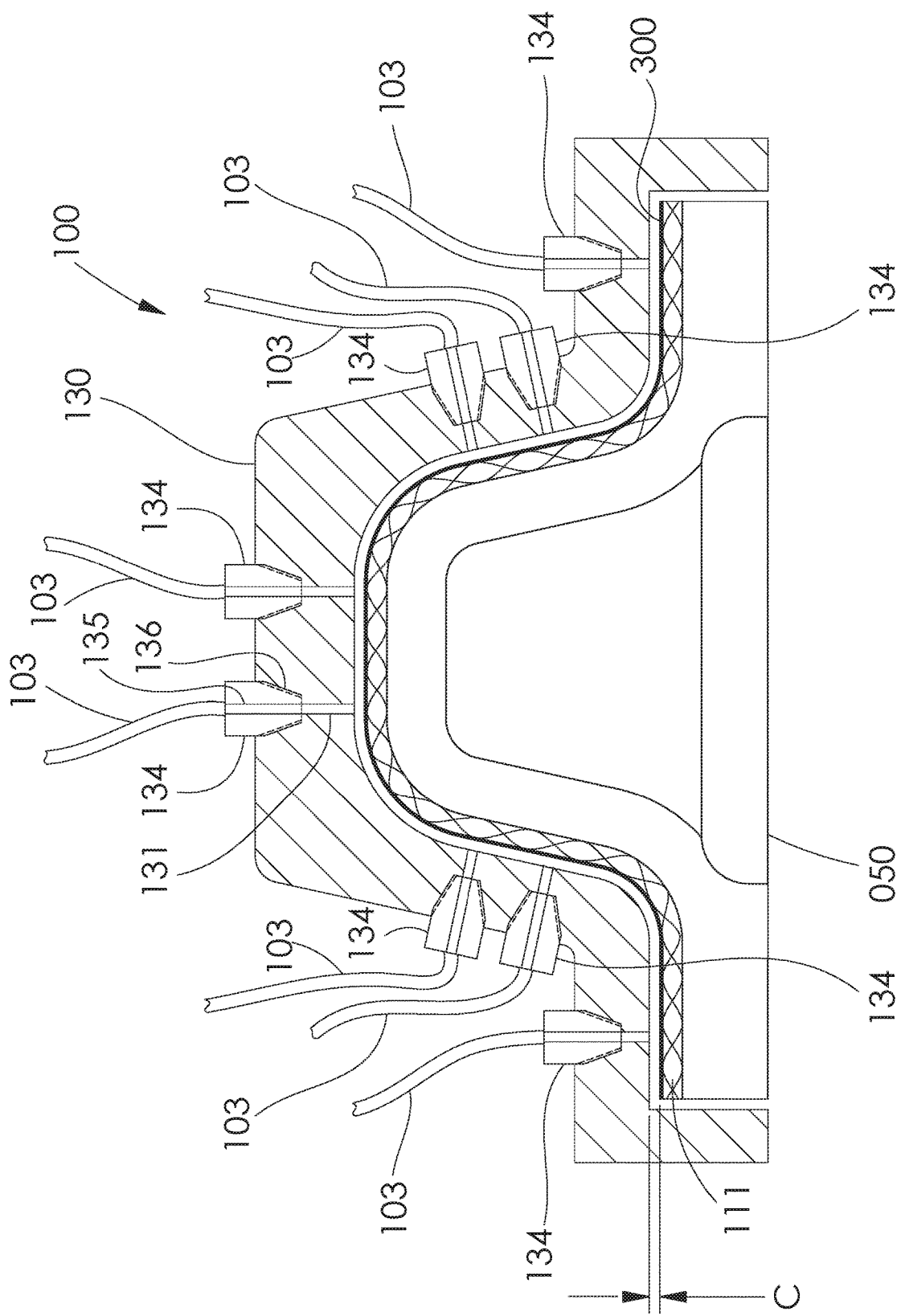
FIG. 6b depicts a cross sectional view, taken in a transverse direction to the longitudinal axis of motivation of the structural composite, of one embodiment of the wetting means of the invention, in which resin is applied to a surface of a structural composite by providing resin through channels in a wetting die.

Referring now to FIG. 6b, a more detailed view of one embodiment of the invention depicting the application of resin by using wetting die 130 is depicted. A cross sectional view, taken in a transverse direction to the longitudinal axis of motivation A of the structural composite, of one embodiment of the wetting means of the invention, namely a wetting die, in which resin is applied to a surface of a structural composite by providing resin through channels in the wetting die. A structural preform 050 comprised of a structural foam core and a fabric layer 301 attached thereto by any of the methods hereinbefore mentioned or as known in the art is motivated in the longitudinal axis of motivation A (not shown in FIG. 6b but depicted in FIG. 5b). As structural preform 050 is motivated in direction A, resin is applied to structural preform 050 by forcing resin through die channels 131 which are channels for communicating resin from resin conduction means 103, through at least one die channel 131 in wetting die 130, and onto the surface to be wetted of composite preform 050. The resulting resin impregnation 114 of fabric layer 111 provides the desired wetting of the composite preform 050, and from wetting station 100 the wetted composite preform may be motivated to the curing station 200 of the invention or other process as desired by the user. Wetting die 130 may be set away from the surface to be wetted by a distance C which may be selected by the user as required to achieve the desired wetting amount of fabric layer 301 of composite preform 050. Resin may be communicated into wetting die adapter 134 through resin communication means 103. Wetting die adapter 134 may contain wetting die adapter channel 135, which is a channel for passing resin through wetting die adapter 134, and may further comprise wetting die adapter male threads 136 which may be threadingly engaged with matching female threads in wetting die 130 such that resin is communicated into wetting die adapter 134 from resin communication means 103. When wetting die adapter 134 is threadingly engaged with matching threads in wetting die 130, die channel 131 may align with wetting die adapter channel 135 such that resin may flow from resin communication means 103 through wetting die adapter channel 135 and then through die channel 131 and onto the composite preform, wetting the fabric layer 301 of composite preform 050 and leaving a layer of resin 114 on fabric layer 301.

Referring now to FIG. 6c, a more detailed view of one embodiment of the invention depicting the application of resin by using brush assembly 140 is depicted. A cross sectional view, taken in a transverse direction to the longitudinal axis of motivation of the structural composite, of one embodiment of the wetting means of the invention, namely a brush, in which resin is applied to a surface of a structural composite. In this embodiment, resin is applied by providing resin to bristles attached to a wetting brush. A structural preform 050 comprised of a structural foam core and a fabric layer 301 attached thereto by any of the methods hereinbefore mentioned or as known in the art is motivated in the longitudinal axis of motivation A (not shown in FIG. 6c but depicted in FIG. 5c). As structural preform 050 is motivated in direction A, resin is applied to structural preform 050 by forcing resin through wetting brush channels 143 which are channels for communicating resin from resin conduction means 103, through wetting brush channels 143 in wetting brush body 141, and onto the surface to be wetted of composite preform 050. The resulting resin impregnation 114 of fabric layer 111 provides the desired wetting of the composite preform 050, and from wetting station 100 the wetted composite preform may be motivated to the curing station 200 of the invention or other process as desired by the user. Wetting brush body 140 may be set away from the surface to be wetted by a distance E which may be selected by the user as required to achieve the desired wetting amount of fabric layer 111 of composite preform 050. Resin may be communicated into wetting brush adapter 144 through resin communication means 103; arrow D depicts the direction of resin flow through resin communication means 103. Wetting brush adapter 144 may contain wetting brush adapter channel 146, and may further comprise wetting brush adapter male threads 147 which may be threadingly engaged with matching female threads in wetting brush body 141 such that resin is communicated into wetting brush adapter 144 from resin communication means 103 in direction of flow D. When wetting brush adapter 144 is threadingly engaged with matching threads in wetting die 130, wetting brush channel 143 may align with wetting brush adapter channel 146 such that resin may flow from resin communication means 103 through wetting brush adapter channel 146 and then through wetting brush channel 143 and onto the composite preform, wetting the fabric layer 301 of composite preform 050 and leaving a layer of resin 114 on fabric layer 301.

Figure 7:
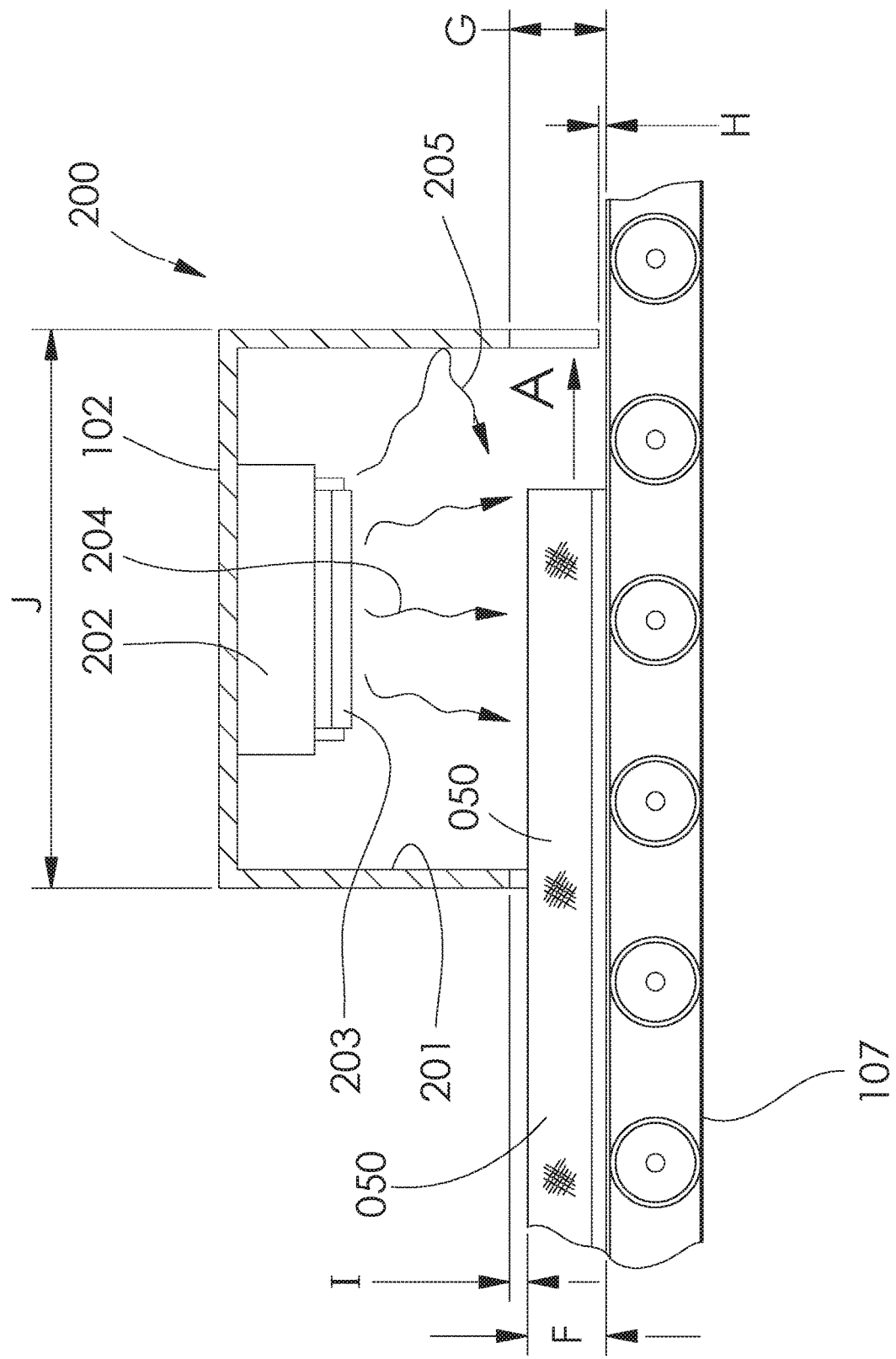
FIG. 7 depicts a cross sectional view of the curing means and step of the invention, the view being taken along the longitudinal axis of motivation of the structural composite, and showing the heat or light radiating structure of the curing means.

Referring now to FIG. 7, a cross sectional view of the curing means and step of the invention, the view being taken along the longitudinal axis of motivation of the structural composite, and showing the curing element which may be a heating or light radiating element is depicted. A structural preform 050 comprised of a structural foam core and a fabric layer attached thereto by any of the methods hereinbefore mentioned or as known in the art may be motivated in the longitudinal axis of motivation A by conveyor 107. At least one electrical fixture 202 may be attached to an interior surface of curing enclosure 102; in most cases, a plurality of electrical fixtures may be attached to interior surfaces of curing enclosure 102 either directly or indirectly, or alternatively they may be attached to other structure, but in any event electrical fixture(s) 202 may be adapted to receive resin curing elements 203 which may be, for example, heating elements or lights. Interior surfaces 201 of curing station enclosure 102 may be coated in a light and/or heat reflective coating such as light or heat reflective paint so that heat and/or light radiation 204 will be reflected, as depicted by reflected heat or light ray 205 internal to curing station enclosure 102, providing more intensity of heat radiation or light radiation, or both, onto the composite preform wetted surfaces and resulting in a more efficient cure. A plurality of curing elements 203 may be spaced around the interior of curing enclosure 102 also to achieve the desired intensity of heat and/or light radiation impinging the wetted surfaces of the composite preform as it is motivated in the direction of longitudinal axis of motivation A. It is to be noted that a curing station of the invention may comprise more than one type of curing means or elements: i.e., it may comprise lighting elements and heating elements for curing the wetted composite preform. In other words, both heating elements and light elements may be utilized in a single curing station. The use of one type of cure method does not preclude the use of another cure method in the same cure step.

Still referring to FIG. 7, composite preform 050 may have a height F. It may be desirable to design the enclosure such that only a small clearance I exists between the opening in curing enclosure 102 that accepts composite preform 050 as it is motivated in a longitudinal direction of motivation A. The same may be true for dimension G depicted in FIG. 7: this dimension may selected to by only slightly larger than the height of composite preform 050. In this manner only a small amount of light/and or heat may escape the enclosure. Clearance H is required so that there is no interference between the moving belt of conveyor 107 and curing enclosure 102. As an example, and not by way of limitation, dimensions I and G may be chosen that there is only one half inch or less between the opening allowing composite preform to enter or exit curing station 200.

Still referring to FIG. 7, the length J of curing enclosure 102 may be calculated for one exemplary composite preform utilizing light cure techniques that exemplifies an advantage of the system of the invention over the pultrusion processes of the prior art. Suppose that the resin used to wet the composite preform is a light-curable resin that requires 15 seconds of exposure to a specific wavelength and intensity of light in order to properly cure. Also suppose that the composite preform fabrication process 001 that precedes the wet-out process 010, such as the method disclosed and taught in the '469 patent, is capable of producing composite preforms at 16 ft/minute. In order for the curing station to allow a continuous, uninterrupted run rate matching the composite preform fabrication at 16 ft/minute, length J must be sufficient to expose all areas of the wetted composite preform to light of the required wavelength and intensity for at least 15 seconds, or one quarter of a minute, in order for the wetted surfaces of the preform to properly cure. Thus the length J of curing enclosure 102 may be calculated for this example as being required to be at least 0.25 minutes×16 ft/minute=4 feet in length. The required length J of curing enclosure 102 must thus be at least 4 feet in order for the system of the invention to produce a continual run of composite preforms without interruption.

Figure 8:
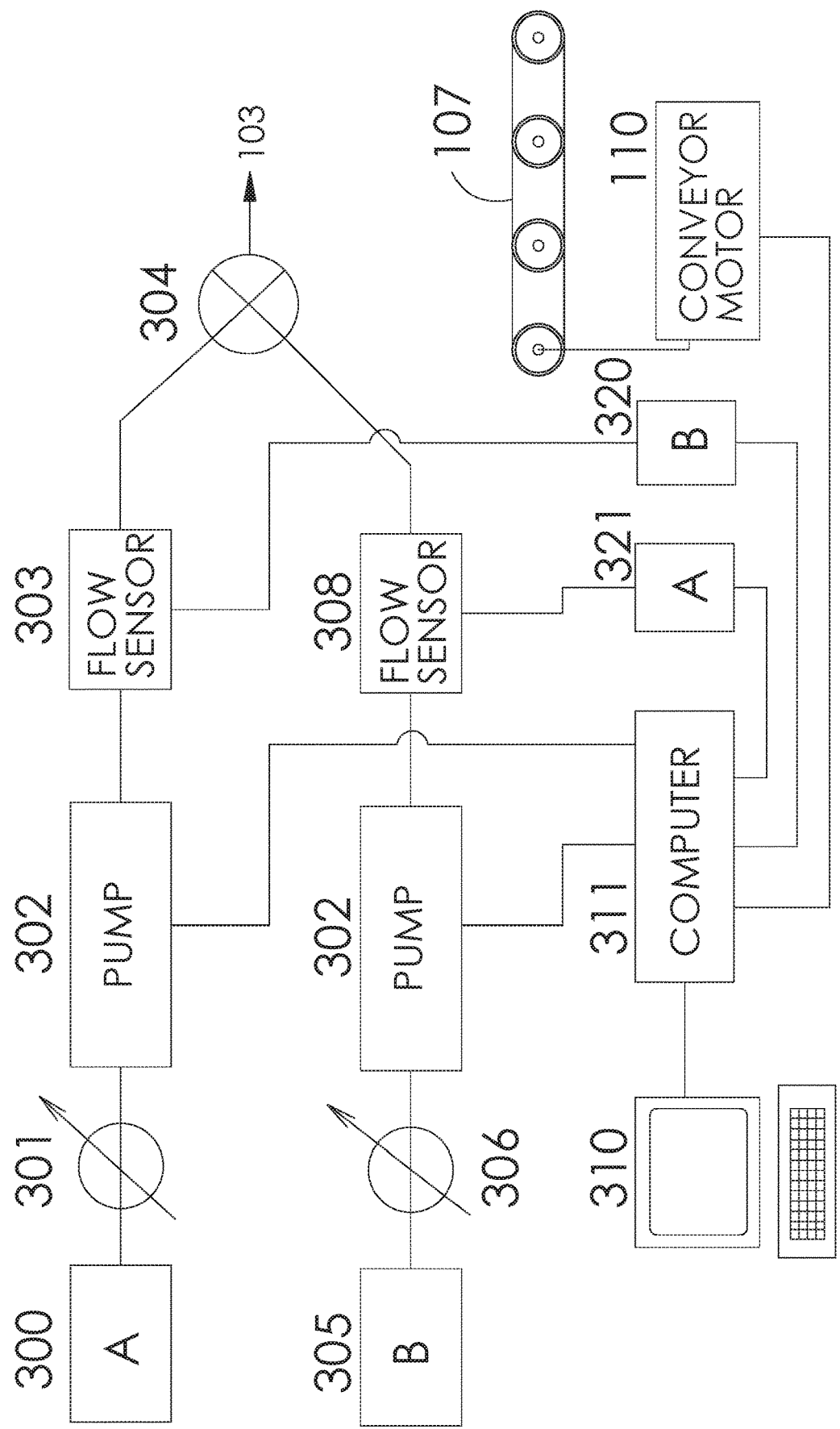
FIG. 8 depicts a block diagram of the connections of a preferred embodiment of the structural composite wet-out and cure system of the invention, showing the connections to a computer, resin and catalyst supply and flow sensors and flow controls, resin application head and conveyor motor and motor control for controlling the speed of the conveyor that provides motivation of the structural composite to be wetted along the longitudinal axis of motivation.

Referring now to FIG. 8 a block diagram of the electrical communication connections of a preferred embodiment of the structural composite wet-out and cure system of the invention is depicted, showing the connections to a computer, resin supply and flow sensors and flow controls, resin application head and conveyor motor and motor control for controlling the speed of the conveyor that provides motivation of the structural composite to be wetted along the longitudinal axis of motivation. In some instances, the resin may in itself comprise a first part and a second part that are mixed prior to wetting the composite preform. In FIG. 8, a two-part resin application is depicted. The resin used in the wedding process may be a two-part resin, comprising part A and part B. Resin part A may be contained in a resin first part container 300 which is in fluid communication with resin first part shut off valve 301. Resin first part shut off valve 301 may be utilized to shut off the flow of resin part A from resin first part container 300 into the system of the invention. In normal use, resin part A may flow through resin first part shut off valve 301 and may be in fluid communication with resin first part pump 302 which may be utilized to pump resin part a from resin first part container 300 into mixing valve 304 where resin part a may be mixed with resin part B, resulting in mixed resin which is communicated through resin conduction means 103 into wetting station 100. Likewise, resin part B may be contained in a resin second part container 305 which is in fluid communication with resin first part shut off valve 306. Resin second part shut off valve 306 may be utilized to shut off the flow of resin part a from resin first part container 305 into the system of the invention. In normal use, resin part B may flow through resin second part shut off valve 306 and may be in fluid communication with resin second part pump 307 which may be utilized to pump resin part a from resin first part container 305 through resin second part flow sensor 308 into mixing valve 304 where resin part B may be mixed with resin part A, resulting in resin mixture which is communicated through resin conduction means 103 into wetting station 100. Flow sensors 303 and 308 may sense either the mass rate of flow or volume rate of flow, or both, as desired by the user, and provides these sensor inputs to resin first part flow sensor digitizer 320 and resin second part flow sensor digitizer 321, which are in electrical communication with computer 311. Electrical digital outputs from resin first part flow sensor digitizer 320 and resin second part flow sensor digitizer 321 which represent either the mass rate of flow or volume rate of flow, or both, of resin part a and resin part B are provided to inputs on computer 311. Computer 311 may further comprise non-transitory computer readable medium which contains a resin flow rate computer program which may contain instructions for receiving the digital inputs from resin first part flow sensor digitizer 320 and/or resin second part flow sensor digitizer 321, computing a desired rate of flow of resin part a and/or resin part B, and controlling resin first part pump 302 and or resin second part pump 307 to produce a desired mass or volume flow rate of resin part a and or resin part B. Computer 311 may also be in electrical communication with a keyboard and monitor 310 for receiving user inputs. The resin flow rate computer program may also contain instructions for receiving user inputs, for instance through keyboard entry or through other means of inputting information such as wireless means, for instance, Bluetooth or wireless LANs. Such user inputs may comprise desired mass and/or volumetric flow rates for resin part a and/or resin part B, pump control commands, commands to display digitized mass and/or volumetric flow information on a display, and the like.

Still referring to FIG. 8, it is to be understood that in those situations in which a single part resin is utilized, it may be that only the resin first part container 300, resin first part shut off valve 301, resin first part pump 302, and resin first part flow sensor 303 are utilized to deliver resin to resin conduction means 103 through mixing valve 304. In such single part resin applications, mixing valve 304 is not necessarily present. Likewise, the resin flow rate computer program residing in non-transitory computer readable memory on computer 311 may contain instructions only for controlling resin first part pump 302.

Figure 9:
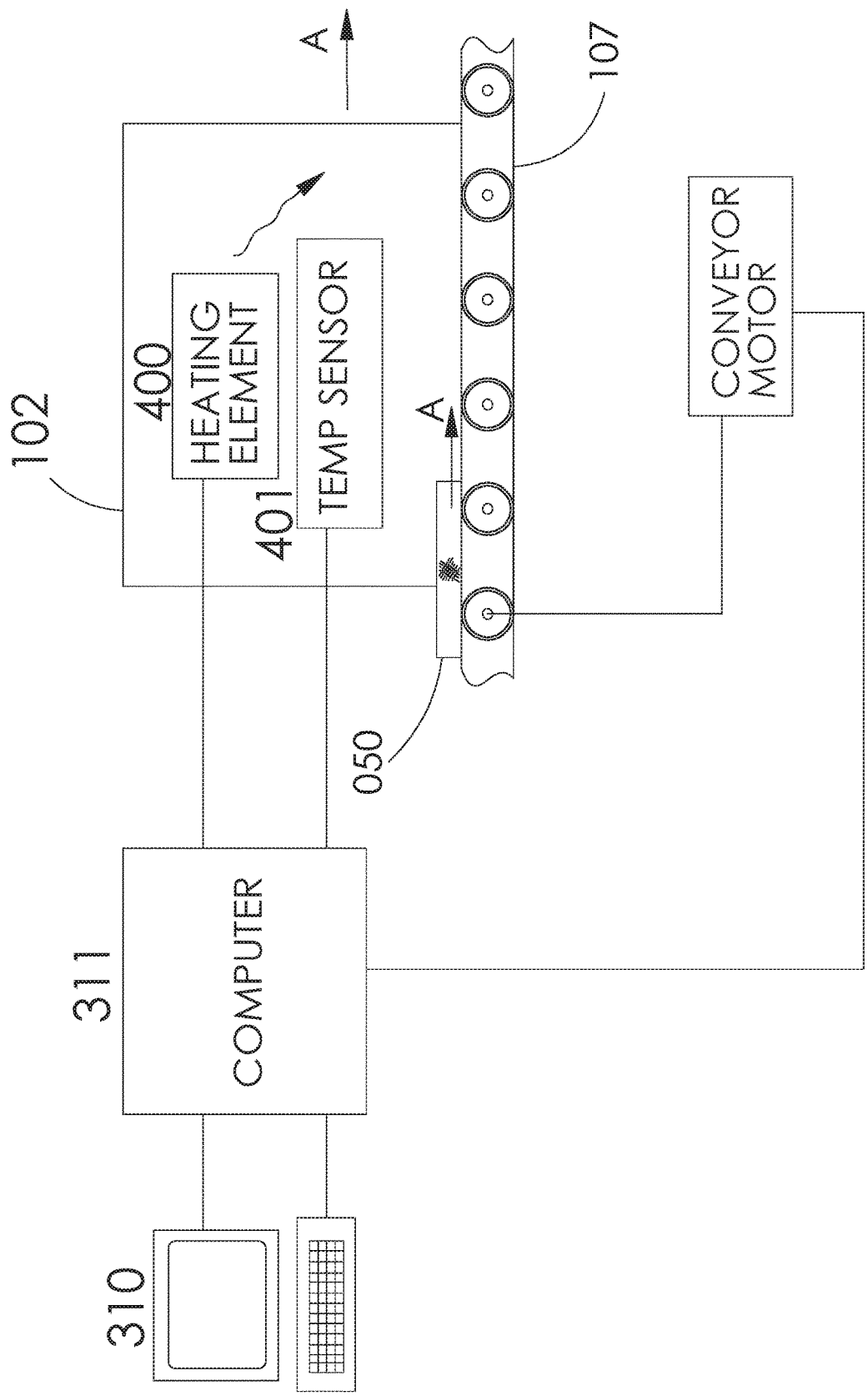
FIG. 9 depicts a block diagram of the connections of a preferred embodiment of the structural composite wet-out and cure system of the invention, showing the connections to a computer and heating element or elements and temperature sensor for applying heat to cure thermoset or other resins as desired.

Referring now to FIG. 9 a block diagram of the electrical connections of a preferred embodiment of the system and method of the invention is depicted, showing the connections to a computer and heating element or elements and temperature sensor for applying heat to cure thermoset or other resins as desired. Heating element 400 may be located inside curing enclosure 102 and, when energized, may radiate heat energy 403 onto composite reform 050 in the case where a heat curable resin or resin combination has been applied to the fabric layers of composite preform 050 during the wetting process. Heating element 400 may be in direct electrical communication with a power source and may be directly controlled by turning the power source off and on as desired, or, alternatively, may be controlled by use of a thermostat as is known in the art. Alternatively, heating element 400 may be in electrical communication with computer 311 which may also be in electrical communication with monitor and keyboard 310. A temperature control program may reside in non-transitory computer readable memory on computer 311 such that it controls the temperature interior to curing enclosure 102. The temperature control program may receive as an input a digitized signal representing the temperature of the interior of curing enclosure 102 as sensed by temperature sensor 401 and digitized by temperature sensor digitizer 402. Temperature sensor 401 may be an electrical communication with temperature sensor digitizer 402, which may in turn be in electrical communication with computer 311. Furthermore, conveyor motor 110 may also be in electrical communication with computer 311, and, a conveyor speed control program may reside in non-transitory computer readable memory on computer 311 and may contain instructions for controlling the speed of conveyor motor 110 in therefore controlling the speed of the motivation of composite preform 050 as it is motivated in a longitudinal axis of motivation as depicted by arrow A. The conveyor speed control program may receive user input through keyboard entry or by wireless means, or by any means known in the art for entering data into a computer, and may utilize such user input to determine a controlled speed as desired by the user. The conveyor speed control program may contain instructions for controlling conveyor motor 110 such that a desired speed of composite preform 050 is achieved. Controlling the speed of composite preform 050 allows the user to establish the time in which the composite preform will remain in curing enclosure 102, where it is exposed to heat radiation from heating element 400 for purposes of curing the resin that was applied to the fabric layer of composite preform 050 during composite preform wet-out step 010 in wetting station 100.

Figure 10:
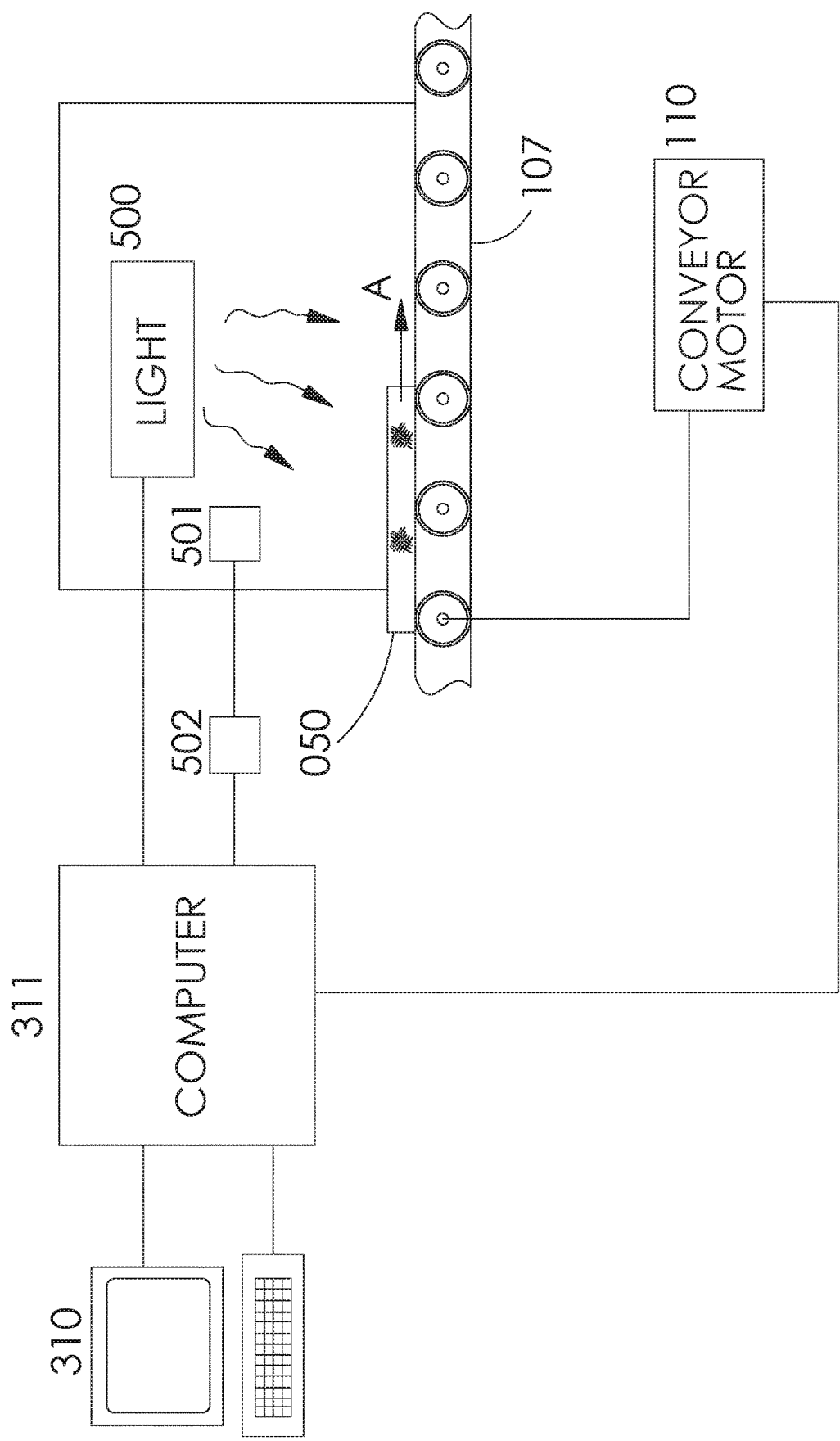
FIG. 10 depicts a block diagram of the connections of a preferred embodiment of the structural composite wet-out and cure system of the invention, showing the connections to a computer and light, which may be but is not necessarily ultraviolet light or lights, for applying light energy to cure resins as desired.

Referring now to FIG. 10 a block diagram of the connections of a preferred embodiment of the system and method of the invention is depicted, showing the connections to a computer and light, or plurality of lights, which may be but are not necessarily ultraviolet light or lights for applying light energy to cure light-curable resins as desired. Lighting elements 500 may be located inside curing enclosure 102 and, when energized, may radiate light energy 503, which may be but is not necessarily ultraviolet light, onto composite reform 050 in the case where a light curable resin or resin combination has been applied to the fabric layers of composite preform 050 during the wetting process. Lighting element 500 may be a single light element or a plurality of light elements and may be in direct electrical communication with a power source and may be directly controlled by turning the power source off and on as desired, or, alternatively, may be controlled by use of a photocell as is known in the art. Alternatively, lighting element 500 may be in electrical communication with computer 311 which may also be in electrical communication with monitor and keyboard 310. A lighting control program may reside in non-transitory computer readable memory on computer 311 such that it controls the intensity of light interior to curing enclosure 102. The lighting control program may receive as an input a digitized signal representing the intensity of light in the interior of curing enclosure 102 as sensed by light intensity sensor 501, which may be, for instance, a photocell and is digitized by lighting sensor digitizer 502. Light intensity sensor 501 may be in electrical communication with lighting sensor digitizer 502, which may in turn be in electrical communication with computer 311. Furthermore, conveyor motor 110 may also be in electrical communication with computer 311, and, a conveyor speed control program may reside in non-transitory computer readable memory on computer 311 and may contain instructions for controlling the speed of conveyor motor 110 in therefore controlling the speed of the motivation of composite preform 050 as it is motivated in a longitudinal axis of motivation as depicted by arrow A. The conveyor speed control program may receive user input through keyboard entry or by wireless means, or by any means known in the art for entering data into a computer, and may utilize such user input to determine a controlled speed as desired by the user. The conveyor speed control program may contain instructions for controlling conveyor motor 110 such that a desired speed of composite preform 050 is achieved. Controlling the speed of composite preform 050 allows the user to establish the time in which the weighted composite preform will remain in curing enclosure 102, where it is exposed to light radiation from lighting element 500 for purposes of curing the resin that was applied to the fabric layer of composite preform 050 during composite preform wet-out step 010 in wetting station 100.

Figure 11:
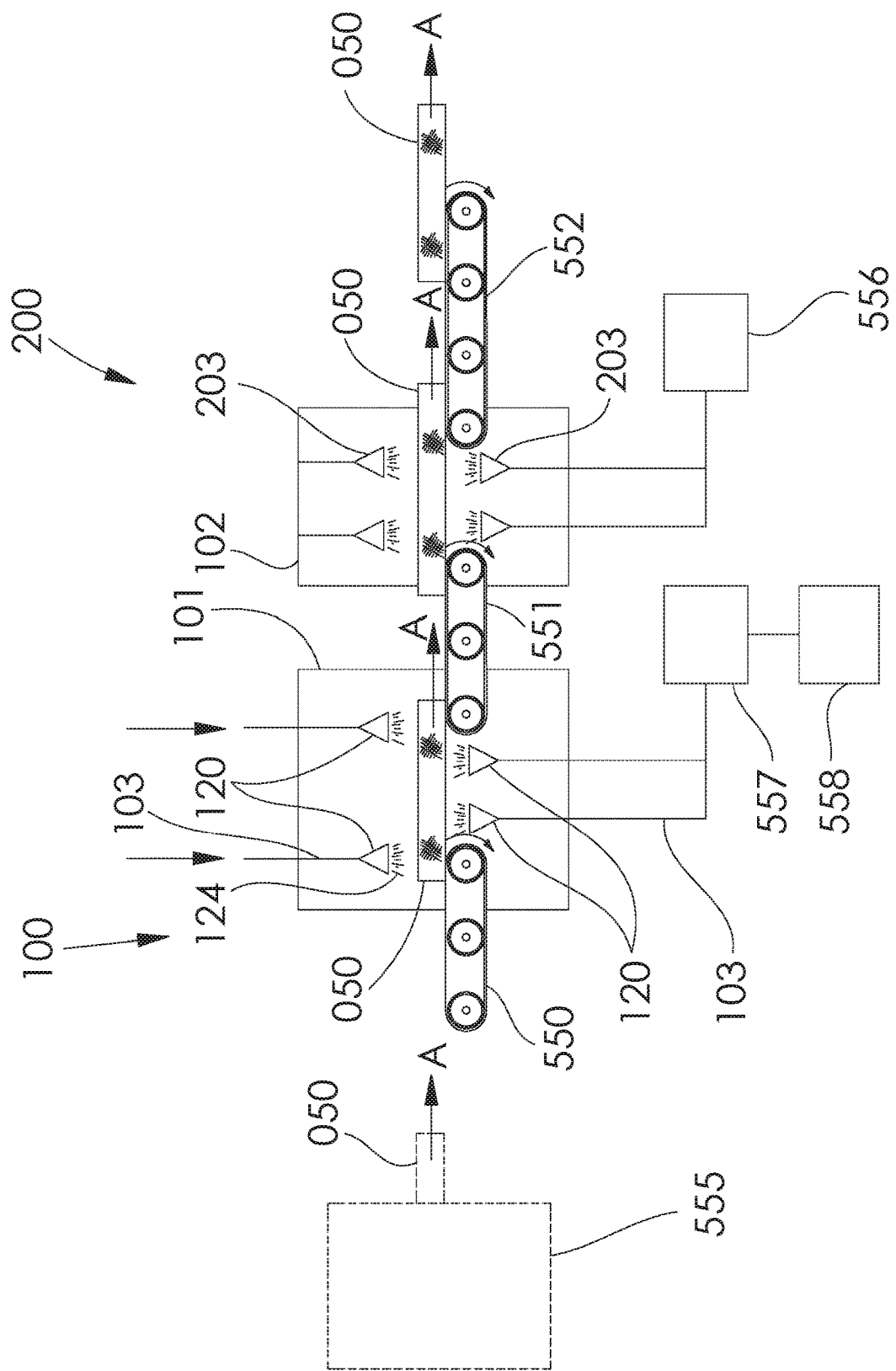
FIG. 11 depicts an alternate embodiment of the invention in which structural composite preforms are wetted with resin by spraying, followed by the steps of either heat-curing or light-cuing the wetted preform.

Referring now to FIG. 11 an alternate embodiment of the system and method of the invention in which structural composite preforms are wetted with resin by spraying, followed by the steps of curing the resin on the wetted preform is depicted. Composite preforms 050 are fabricated by any means known in the art 555. In a preferred embodiment, composite preforms are fabricated by the method taught in the '496 patent or the '818 patent. Composite preforms 050 are motivated in a longitudinal direction of motivation A by a system of conveyors which may comprise a first conveyor 550, a second conveyor 551 and a third conveyor 552. While three conveyors are depicted in the figure, the invention may comprise any number of conveyors. Composite preforms 050 may be motivated through wetting enclosure 101 of wetting station 100 where they are wetted by sprayed resin 124 from at least one but preferably a plurality of resin spray heads 120. Resin spray heads are in fluid communication with resin pump 557 which is in fluid communication with resin reservoir 558. Resin is pumped from resin reservoir 558 through resin conduction means 103 to spray heads 120, whereupon resin is sprayed 124 onto the composite preform, wetting the fabric thereon. It is to be noted that resin spray heads 120 may encompass composite preform 050 on all sides such that the preform 050 is complete wetted; and furthermore that the gap between conveyor 550 and conveyor 551 allows composite preform to be sprayed with resin from underneath, as depicted in the figure. The wetted composite preforms 050 may then be motivated into and through curing enclosure 102 of curing station 200 where the resin is cured by resin curing means, which means may comprise heating, illumination by curing light, ionizing radiation curing, or by any curing means known in the art. Resin curing elements 203, which may be heat sources such as resistive heat sources or any heat source known in the art, or which alternatively may be lights adapted to cure the resin applied in wetting station 100, such as, for example, ultraviolet lights, are in electrical communication with curing element power supply 556 which provides electric power to resin curing elements 203. The resin which has wetted composite preform 050 is cured by either heat, light or other curing radiation from resin curing elements 203. It is to be noted that resin curing elements 203 may encompass composite preform 050 on all sides such that the preform is complete radiated with heat or light; and furthermore that the gap between conveyor 551 and conveyor 552 allows composite preform 050 to be irradiated with curing energy, either heat, light or otherwise, from underneath, as depicted in the figure. The cured composite preforms 050 may then be motivated beyond curing enclosure 102 where they may be handled and subjected to post-fabrication processes such as painting or other coating, packaged for shipment or any desired post-fabrication process.

Figure 12:
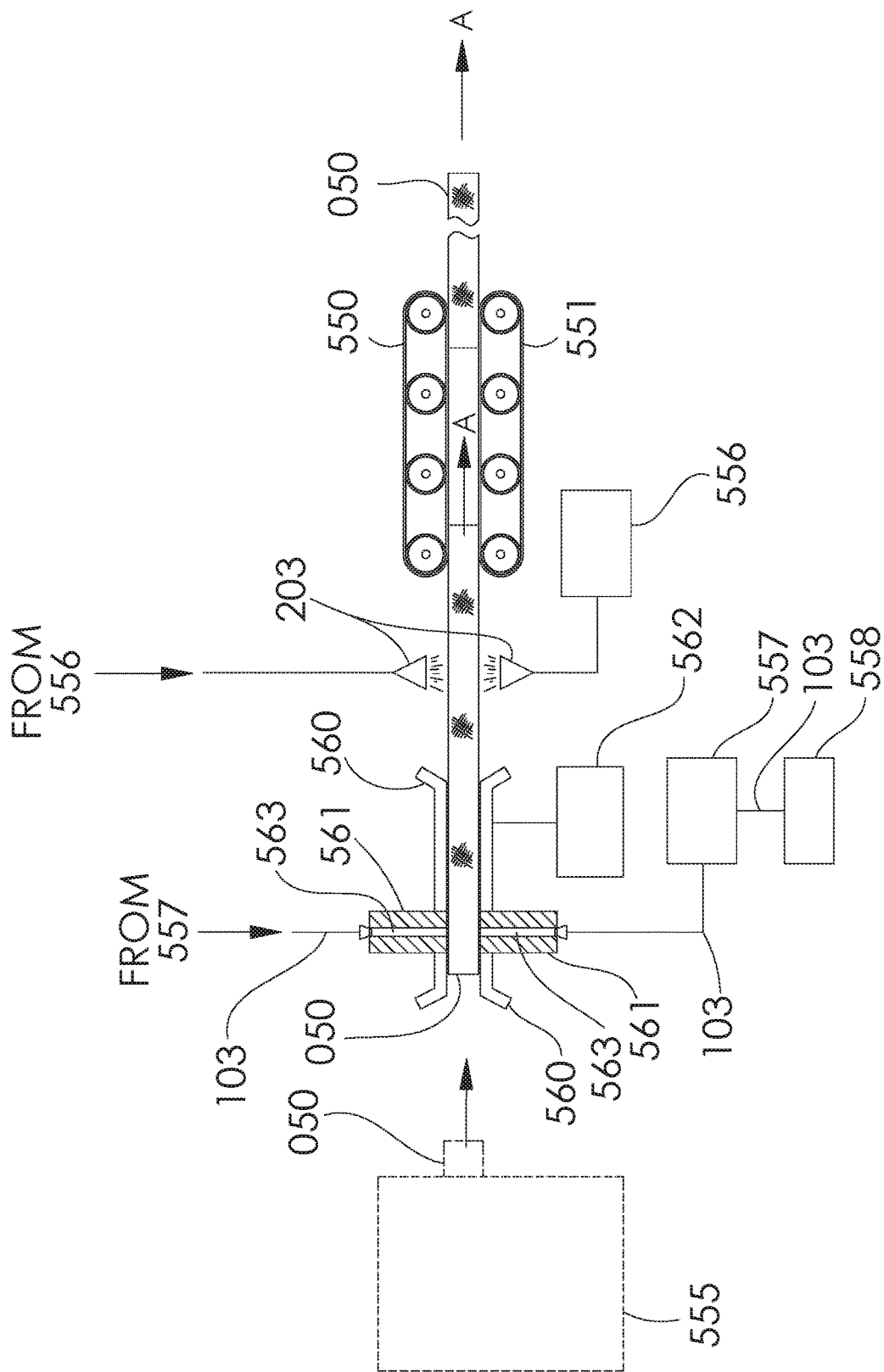
FIG. 12 depicts an alternate embodiment of the system of the invention in which structural composite preforms are wetted with resin by injecting resin through an injection die, followed by the step of heat curing or light-curing the wetted preform.

Referring now to FIG. 12 an alternate embodiment of the system and method of the invention in which structural composite preforms are wetted with resin by injection resin through an injecting die, followed by the steps of curing the wetted preform is depicted. Composite preforms 050 are fabricated by any means known in the art 555. In a preferred embodiment, composite preforms are fabricated 555 by the method taught in the '496 patent or the '818 patent; however the composite preforms may be formed by any method known in the art, including manual forming. Composite preforms 050 may be motivated in a longitudinal direction of motivation A by a system of conveyors which may comprise an output conveyor comprising composite preform fabrication means 555 and a first conveyor 550 and a second conveyor 551. While two conveyors are depicted in the figure, the invention may comprise any number of conveyors. Composite preforms 050 may be motivated through stationary wetting platen 560 where they are wetted by injected resin from at least one but preferably a plurality of stationary platen resin channels 563. Stationary platen resin channels 563 are in fluid communication with resin pump 557 which is in fluid communication with resin reservoir 558 by resin conduction means 103. Resin is pumped from resin reservoir 558 through resin conduction means 103 to stationary platen resin channels 563, whereupon resin is injected onto the composite preform, wetting the fabric thereon. Stationary wetting platen 560 may also be heated by stationary platen heat source 562 which may be a resistance heating element as is known in the art. The wetted composite preforms 050 may then be motivated through curing enclosure 102 where the resin is cured by resin curing means which may comprise heating, illumination by curing light, or by any curing means known in the art. In yet a further alternate embodiment, wetted composite preform 050 may be cured by one or more resin curing elements 203, which may be heat sources such as resistive heat sources or any heat source known in the art, or which alternatively may be lights such as ultraviolet lights, or may be any curing energy source, may be in electrical communication with curing element power supply 556 which provides electric power to resin curing elements 203. The resin which has wetted composite preform 050 may be cured by either heat, light or other curing radiation from resin curing elements 203. The cured composite preforms 050 may then be motivated beyond curing enclosure 102 where they may be handled and subjected to post-fabrication processes such as painting or other coating, packaged for shipment or any desired post-fabrication process.

The system of the invention may also comprise a system of fabric-feeding mechanisms for applying fabric to the composite preform in order to achieve additional strength. One such embodiment is depicted in FIG. 13, which composite preforms 050 may be, in an exemplary first step, fabricated by any of the methods known in the art including but not limited manual fabrication, the methods taught in the '749 and '818 patents, or any other method, and are fed into the system of the invention along longitudinal axis of motivation A.

Figure 13:
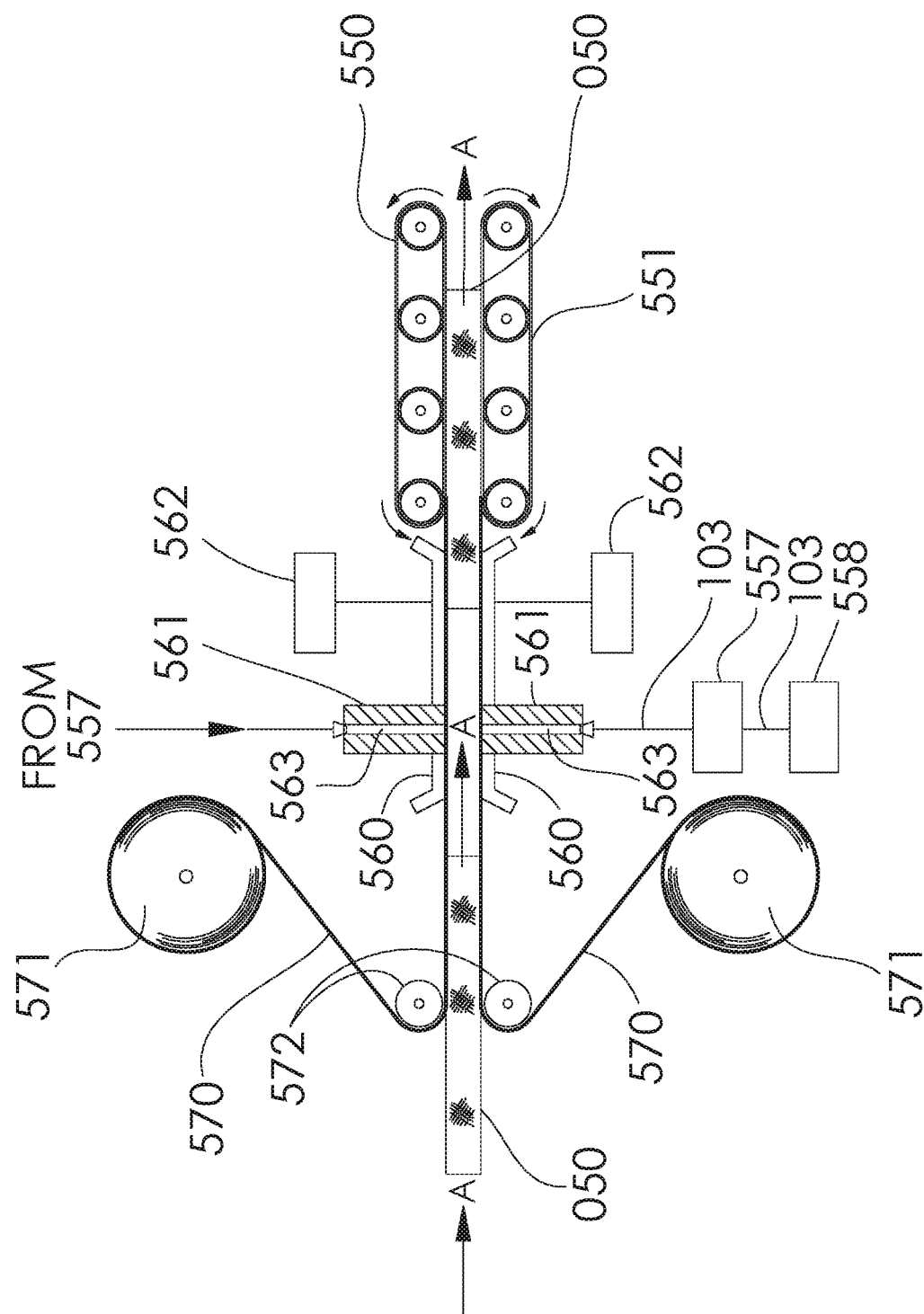
FIG. 13 depicts an alternate embodiment of the system of the invention in which additional fabric layer or layers is applied to exterior surface or surfaces of a composite preform prior to wetting, followed by the step of wetting the composite preform by injecting resin through an injection die, followed by the step of heat-curing the wetted preform.

A reinforcing fabric 570 may be disposed on a reinforcing fabric reel 571, and may be positioned near the system of the invention in such a manner as the example of FIG. 13 indicates such that reinforcing fabric material 570 may be spooled off reinforcing fabric reel 571 to cover or partially cover composite preform 050 as composite preform 050 is motivated along the longitudinal axis of motivation A by pullers 550 and 551. Composite preform 050 may also be pushed along longitudinal axis of motivation A by a motivation system forming part of the composite preform fabrication step (not shown in FIG. 13). Reinforcing fabric material 570 is pulled from reinforcing fabric reel 571, over roller 572, whereupon it comes into contact with composite preform 050. While there are two reinforcing fabric reels 571 dispending reinforcing fabric 570 onto composite preform 050 depicted in FIG. 13, it is to be understood that any number of reinforcing fabric reels 571 may comprise the invention and that reinforcing fabric 570 may be dispensed onto the top, bottom, sides, or any portion of composite preform 050 by the system of the invention. All such variations of number of reinforcing fabric reels 571, and all variations of coverage of composite preform 050 are within the scope of the invention. It may be desired by the user to only reinforce a portion of composite preform 050 for particular preform applications in order to achieve, for example, weight savings in the final cured composite product, for cost savings reasons, or for any other reason.

Still referring to FIG. 13, composite preform 050 which may be covered partially or fully with reinforcing fabric 570 is motived along longitudinal axis of motivation A as described herein and passes through stationary wetting platen 560, where it is wetted by resin injected by stationary platen injection die 561 through one or more stationary platen resin channels 563 in those areas desired to be wetted. Stationary platen injection die 561 may be fabricated from any material suitable for being in contact with resin, including but not limited to steel or other metal. The user may decide to configure stationary platen injection die 560 such that the entirety of composite preform 050 is wetted, or may alternatively configure stationary platen injection die 560 such that only a portion of composite preform 050 is wetted. Composite preform 050 continues in direction A where it encounters heat from stationary platen heat source 562, which may be a resistive heat source that operates to cure the resin. Stationary wetting platen 560 may be fabricated from any material that will not suffer corrosion by contact with the resin: a typical platen may be fabricated from suitable metal, and specifically steel or chrome-plated steel may be utilized as a material for stationary wetting platen 560. Composite preform 050 continues to be motivated along longitudinal axis of motivation A by first conveyor 550 and second conveyor 551 which may be configured to act as pullers as shown in FIG. 13, or may be configured in any manner desired by the user in order to motivate composite preform 050 along longitudinal axis of motivation A. Once the cured composite preform 050 exits the system, it may be cut to length by any suitable cutoff method which may include, for example, a band saw mounted on an articulating apparatus such that it may be motivated on to composite preform 050; by hand sawing, by hot wire motivated through composite preform 050 or by any other cutoff method known in the art. Stationary platen resin channels 563 are in fluid communication with resin pump 557 which is in fluid communication with resin reservoir 558 by resin conduction means 103. Resin is pumped from resin reservoir 558 through resin conduction means 103 to stationary platen resin channels 563, whereupon resin is injected onto the composite preform, wetting the fabric thereon.

Figure 14:
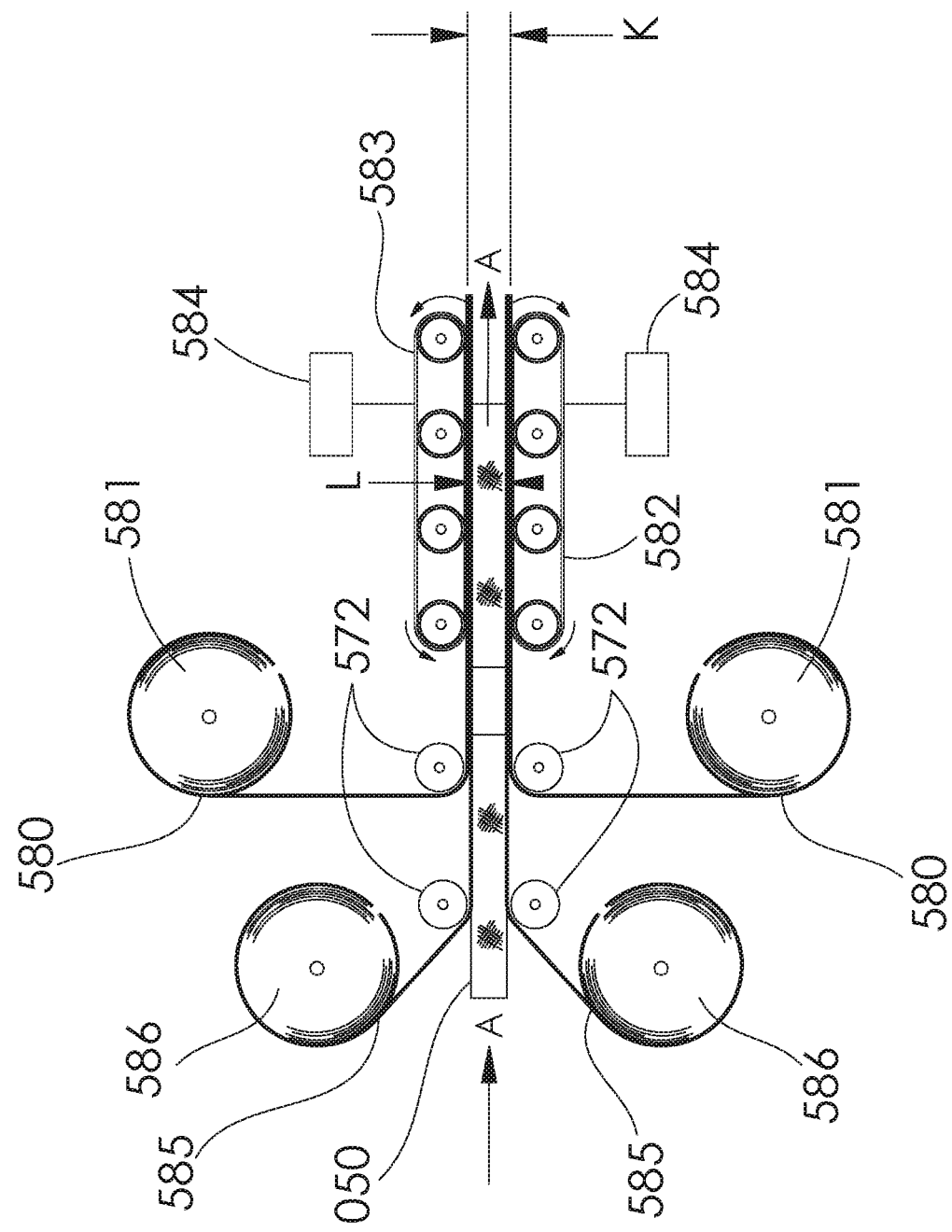
FIG. 14 depicts an alternate embodiment of the system of the invention in which additional pre-impregnated fabric layer or layers may be applied to exterior surface or surfaces of a composite preform, followed by the step of curing the preform by heat-curing the pre-impregnated fabric.

Referring now to FIG. 14, an alternate embodiment of the invention in which additional pre-impregnated fabric layer or layers may be applied to exterior surface or surfaces of a composite preform, followed by the step of curing the preform by heat-curing the pre-impregnated fabric is depicted. Pre-impregnated fabric (or "pre-preg") is defined as fabric having a matrix material, such as curable resign, pre-impregnated such that it does not require wetting with resin, and may be cured on demand by a curing process such as application of heat, light, especially UV light, or other curing methods. The embodiment of the invention depicted in FIG. 14 comprises a system of fabric-feeding mechanisms for applying a pre-impregnated fabric 585 to the composite preform in order to achieve additional strength. Composite preforms 050 may be, in an exemplary first step, fabricated by any of the methods known in the art including but not limited manual fabrication, the methods taught in the '749 and '818 patents, or any other method, and are fed into the system of the invention along longitudinal axis of motivation A. A resin pre-impregnated fabric 585 may be disposed on a pre-impregnated fabric reel 586, and may be positioned near the system of the invention in such a manner as the example of FIG. 14 indicates such that pre-impregnated fabric 585 may be spooled off pre-impregnated fabric reel 586 and pass over roller 572 to cover or partially cover composite preform 050 as composite preform 050 is motivated along the longitudinal axis of motivation A by operation of first rolling platen 582 and second rolling platen 583. Likewise, a transfer film 580 may be disposed on a transfer film reel or reels 581, and may be positioned near the system of the invention in such a manner as the example of FIG. 14 indicates such that transfer film 580 may be spooled off transfer film reel or reels 581 and pass over roller 572 to create a transfer surface for composite preform 050 as composite preform 050 is motivated along the longitudinal axis of motivation A by operation of first rolling platen 582 and second rolling platen 583. First rolling platen 582 and second rolling platen 583 are in thermal communication with rolling platen heat source 584 with may further be in electrical communication with a power source, such that first rolling platen 582 and second rolling platen 583 are heated to a temperature that is suitable for curing pre-impregnated fabric 585. First rolling platen 582 and second rolling platen 583 may be separated by a distance K which may be selected to provide a compressive force L on composite preform 050 as it passes through first rolling platen 582 and second rolling platen 583, which may aid in the curing of pre-impregnated fabric 585. First rolling platen 582 and second rolling platen 583 are of the type known in the art for applying pressure to a moving object. Such rolling platens are known in the art and typically comprise a sheet material that is configured as an endless loop disposed on at least two motivating rollers similar in the configuration of a conveyor. The sheet material may be composite material, sheet metal such as stainless steel, or any material that is flexible and durable enough to operate in the manner described. Transfer film 580, which may be any sheet material that is known in the art for use composite preform construction but is typically polymer sheet material that is not adversely affected by the chemical makeup of the resins, pre-impregnated fabric 585, heat, or other chemicals and/or environments of the process of the invention, may be disposed between a surface of the endless loop material of first rolling platen 582 and second rolling platen 583 where it prevents build-up of resin on the rolling platens, and further may protect the endless loop material from harmful effects of the chemical makeup of pre-impregnated fabric 585. While two rolling platens are depicted in FIG. 14, the invention may comprise any number of rolling platens. Once the cured composite preform 050 exits the system, it may be cut to length by any suitable cutoff method which may include, for example, a band saw mounted on an articulating apparatus such that it may be motivated on to composite preform 050; by hand sawing; by hot wire motivated through composite preform 050 or by any other cutoff method known in the art.

Figure 15:
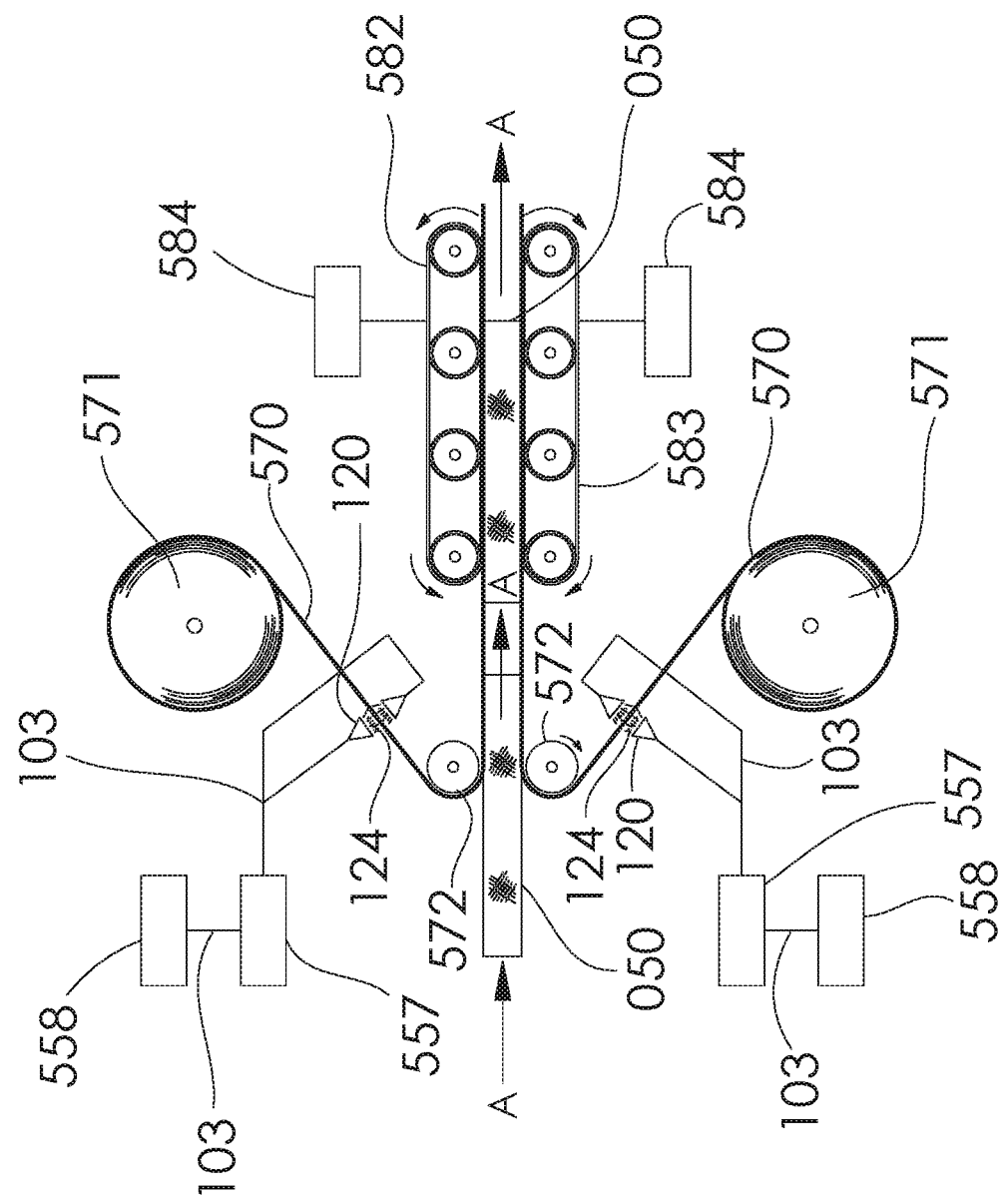
FIG. 15 depicts an alternate embodiment of the system of the invention in which additional wetted fabric layer or layers is applied to exterior surface or surfaces of a composite preform, followed by the step of heat-curing the composite preform.

Referring now to FIG. 15, an alternate embodiment of the invention in which additional reinforcing fabric layer or layers 570 may be applied to exterior surface or surfaces of a composite preform, followed by the step of curing the preform by heat-curing is depicted. The embodiment of the invention depicted in FIG. 15 comprises a system of fabric-feeding mechanisms for applying a reinforcing fabric 570 to the composite preform in order to achieve additional strength. Composite preform 050 may be, in an exemplary first step, fabricated by any of the methods known in the art including but not limited manual fabrication, the methods taught in the '749 and '818 patents, or any other method, and are fed into the system of the invention along longitudinal axis of motivation A. A reinforcing fabric 570 may be disposed on a reinforcing fabric reel 571, and may be positioned near the system of the invention in such a manner as the example of FIG. 15 indicates such that reinforcing fabric 570 may be spooled off reinforcing fabric reel 571 whereupon it may pass between resin spray heads 120 to be wetted by sprayed resin 124. Resin spray heads are in fluid communication with resin pump 557 by resin conduction means 103 as described herein; resin pump 557 is in fluid communication with resin reservoir 558. After being wetted, reinforcing fabric 570 may pass over rollers 572 and thereupon cover or partially cover composite preform 050 as composite preform 050 is motivated along the longitudinal axis of motivation A by operation of first rolling platen 582 and second rolling platen 583. First rolling platen 582 and second rolling platen 583 are in thermal communication with rolling platen heat source 584 which may be a resistive heat source and may further be in electrical communication with a power source, such that first rolling platen 582 and second rolling platen 583 are heated to a temperature that is suitable for curing the resin. First rolling platen 582 and second rolling platen 583 are of the type known in the art for applying pressure to a moving object. Such rolling platens are known in the art and typically comprise a sheet material that is configured as an endless loop disposed on at least two motivating rollers similar in configuration to a conveyor. The sheet material may be composite material, sheet metal such as stainless steel, or any material that is flexible and durable enough to operate in the manner described. As composite preform 050 passes through first rolling platen 582 and second rolling platen 583 the resin is cured by the heated platens and continues to be motivated in the longitudinal direction of motivation A. While two rolling platens are depicted in FIG. 14, the invention may comprise any number of rolling platens. Once the cured composite preform 050 exits the system, it may be cut to length by any suitable cutoff method which may include, for example, a band saw mounted on an articulating apparatus such that it may be motivated on to composite preform 050; by hand sawing; by hot wire motivated through composite preform 050 or by any other cutoff method known in the art.

Referring now to FIGS. 16*a* and 16*b*, an alternate embodiment of the invention is depicted in which a system and method for assembling a panel comprised of a plurality of composite preforms, wetting the panel and subsequently curing the panel is depicted. FIG. 16*a* depicts a top view; FIG. 16*b* depicts a corresponding side view. The result of this is a composite structural panel that may be of any length, width or thickness desired. Composite preforms 050 may be, in an exemplary first step, fabricated by any of the methods known in the art including but not limited manual fabrication, the methods taught in the '749 and '818 patents, or any other method, and are fed into the system of the invention by conveyors 600, 603 and 601 as depicted in the figure. Conveyors 600 and 601 and first angled guide rail 605 and second angled guide rail 606 may each be set at an angle so as to guide composite preforms such that they converge on conveyor 603 to form a desired panel shape. An exemplary panel shape is shown in the figure. Once the composite preforms are converged on conveyor 603, they pass through a guide rail or plurality of guide rails 607 which provide force transverse to the direction of travel in order to press the panels together to form an un-wetted panel as they are motivated along longitudinal axis of motivation A. The un-wetted panel may than pass through wetting station 100, which may be contained within wetting station enclosure 101 (wetting station 101 is not shown in FIG. 16*a* for clarity). Conveyor 604 motivates the un-wetted panel assembly along longitudinal axis of motivation A where it then may enter into curing station 200, which may be contained within optional curing station enclosure 102 as described elsewhere herein. Curing station 200 may further comprise heating elements 400 emitting heat energy 403 or lighting elements 500 emitting light energy 503 as described herein. The completed, cured composite panel structure 608 then motivated to exit the system of the invention by conveyor 605 where it may be further processed, cut to shape, painted, coated or any other post-fabrication operation. Resin spray heads 120 spray resin 124 onto the surfaces of the panel to be wetted, and are in fluid communication with resin pump 557 (not shown in the figure) by resin conduction means 103 as described herein. Resin pump 557 (not shown in the figure) is in fluid communication with resin reservoir 558 (not shown in the figure). It is to be noted that the pultrusion systems of the prior art are not adapted to wet and cure multi-preform panels, as is done by the present invention.

Figure 17A:
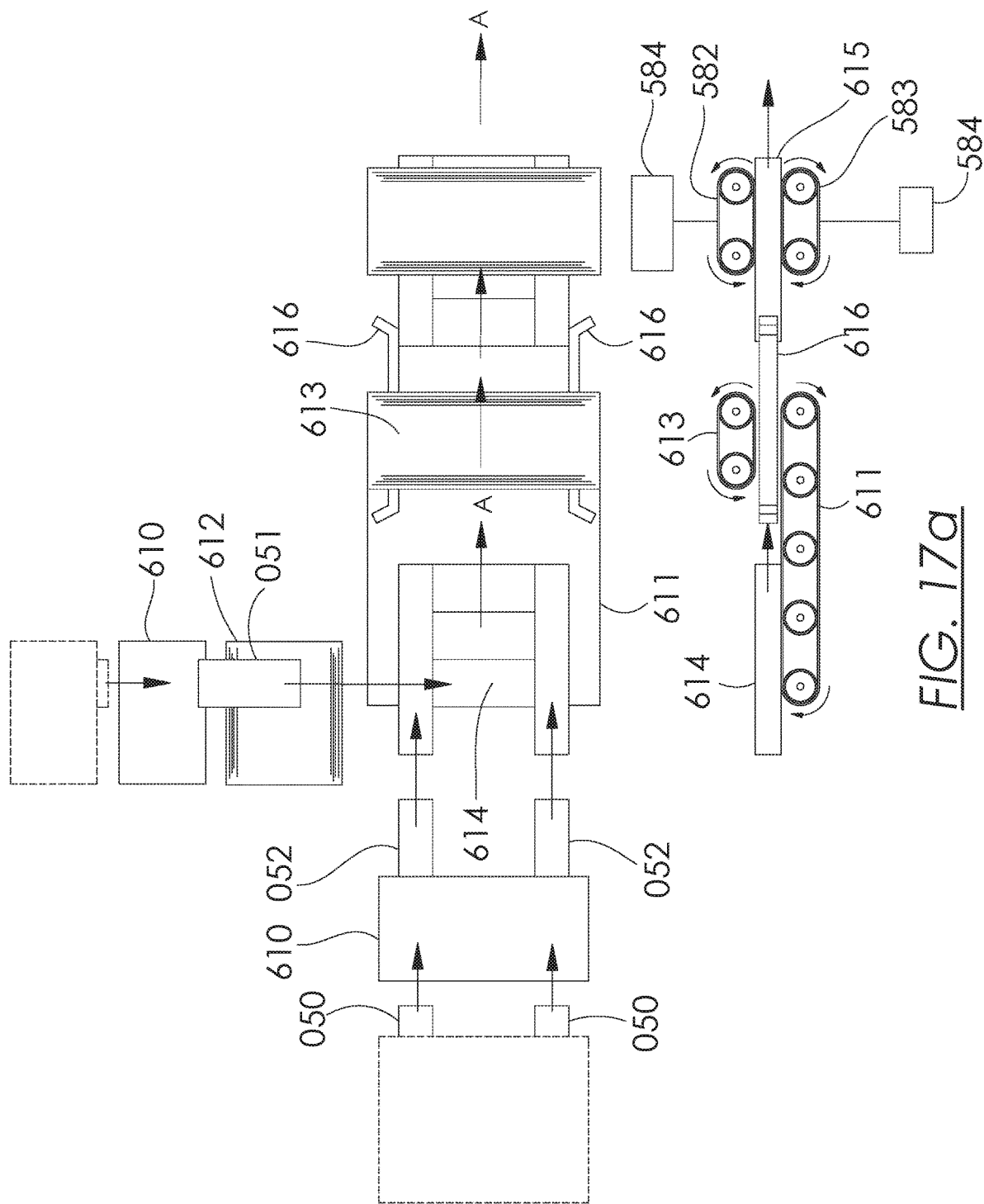
FIG. 17a depicts the production of a panel comprised of a plurality of composite preforms in which the preforms are fabricated by any process known in the art, but is preferably the process taught in U.S. Pat. No. 6,543,469 to Lewit et al.

Referring now to FIG. 17*a*, an alternate embodiment of the invention is depicted in which a system and method for assembling a panel comprised of a plurality of composite preforms, some of which may be disposed transverse to the longitudinal axis of motivation A, wetting the panel and subsequently curing the panel is depicted. The result of this is a composite structural panel that may be of any length, width or thickness desired. Composite preforms 050 may be, in an exemplary first step, fabricated by any of the methods known in the art including but not limited manual fabrication, the methods taught in the '749 and '818 patents, or any other method, and are fed into resin bath 610 as is further depicted in detail in FIG. 17*b*. The resin bath process causes composite preforms 050 to become wetted composite preforms 052. Wetted composite preforms 052 are then motivated by conveyor 611 in the direction of the longitudinal axis of motivation a where they encounter wetted preforms 051 which enter into the gap shown between wetted preforms 052 by being fed in a transverse direction as indicated by conveyor 612. Conveyor 612 is necessarily located at an elevation higher than wetted preforms 052 such that wetted preform 051, which is being fed into the system from a transverse direction as shown, may enter the system without interference with wetted preforms 052 and may fall into place between wetted preforms 052 as shown. In the example shown, a composite panel is constructed comprising two longitudinal elements which are comprised of wetted preforms 052 which have entered the system in a longitudinal direction from bath 610, and for transverse wetted preforms disposed between wetted preforms 052 so as to form the panel assembly is depicted in the figure. It is to be understood that any number of transverse wetted preforms 051 may comprise the invention, and further more transverse wetted panel preforms 051 may be of any length. Thus the wetted composite panel may take any length, width or thickness desired by the user.

Still referring to FIG. 17*a*, wetted composite panel continues to travel in the longitudinal direction of motivation A as motivated by conveyor 611 where it passes between guide rails 616 and may optionally pass beneath conveyor 613. Conveyors 613 and 611 continue to motivate wetted composite panel 614 into first rolling platen 582 and second rolling platen 583, both of which may be in thermal communication with rolling platen heat source 584 such that the resin that has wetted composite panel 614 may be cured, causing cured panel 615 to emerge from the system in the direction indicated by arrow A.

Figure 17B:
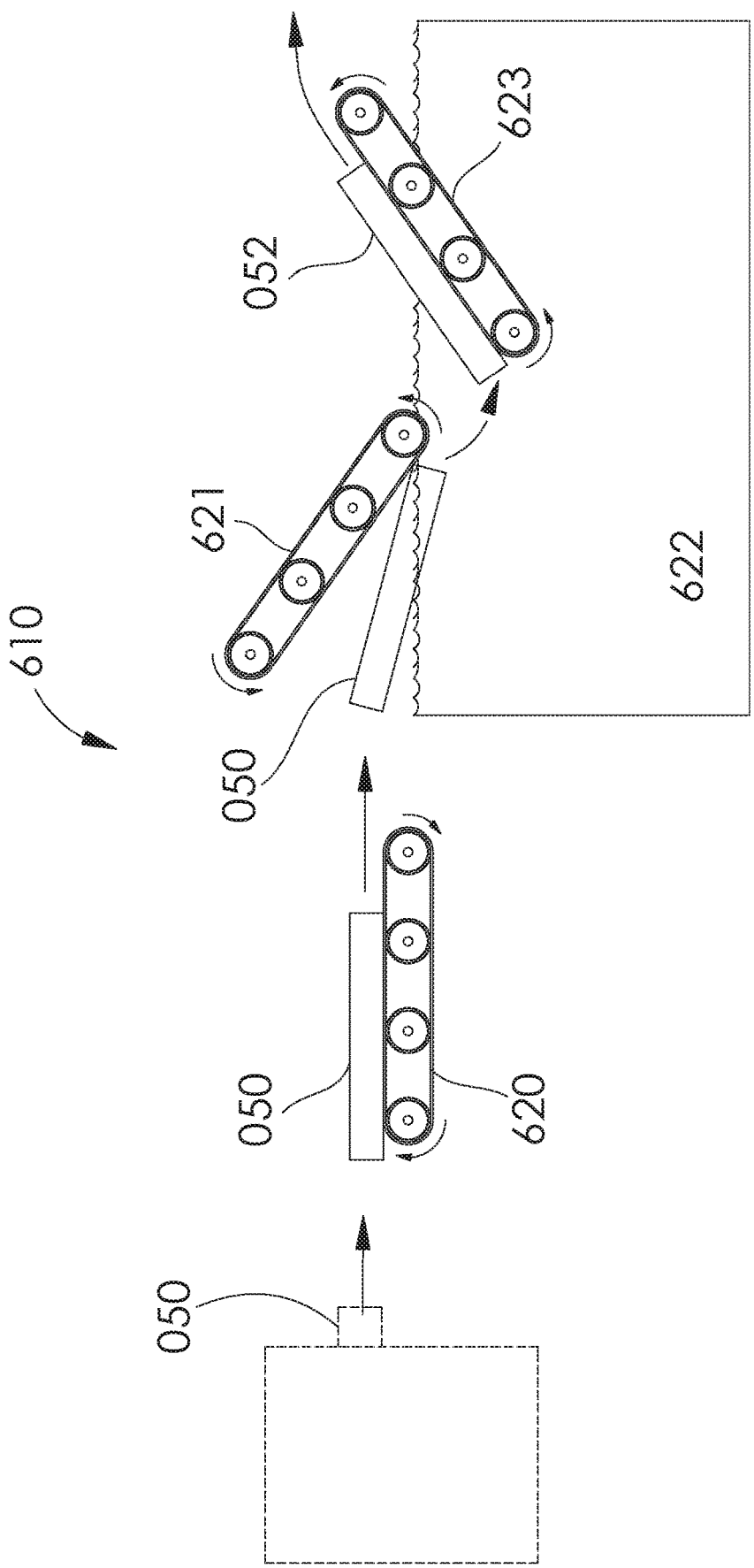
FIG. 17b depicts an alternate embodiment of the wetting step of the system of the invention in which composite preforms are wetted by submersing in a resin bath.

Referring now to FIG. 17*b*, the resin bath step 610 of the invention is depicted. Composite preforms 050 may be, in an exemplary first step, fabricated by any of the methods known in the art including but not limited manual fabrication, the methods taught in the '749 and '818 patents, or any other method, and may be conveyed in a longitudinal axis of motivation a by conveyor 620 whereupon they may fall into resin pool 622, which contains resin as selected by the user. Down angle conveyor 621 causes composite preforms 050 to be translated downward into the pool, whereupon it is completely submerged in resin bath 622. Composite preform 050 continues to be motivated forward through the bath and upwards by up angle conveyor 623 whereupon it may exit the resin bath step 610 as wetted composite preform 052 in the direction of arrow A as indicated in the figure, and where subsequently it may be conveyed along the longitudinal axis of motivation A to receive transverse wetted composite preforms 051 (not shown in FIG. 17*b* but shown in FIG. 17*a*) to form wetted composite panel 614 (not shown in FIG. 17*b* but shown in FIG. 17*a*) as discussed above.

Is to be understood that each of the methods disclosed and taught as comprising the invention may also include the step of vacuum bagging during the cure process. In each of the methods disclosed, the step of applying the vacuum bag apparatus may be interposed between the wetting operation in the curing operation. Vacuum bagging is known in the art as a composite manufacturing process in which vacuum pressure is used during the resin cure cycle. Vacuum bagging offers the advantage of removing air trapped in in between articles to be cured, it compacts fiber layers allowing for more efficient force transmission among fiber bundles comprising the fiber layers, and it reduces humidity of the laminate by removing air from the lamination. Vacuum bagging also improves the fiber to resin ratio in the composite part by eliminating excess resin.

It is also to be understood that the conveyors, motors, enclosures, and other elements comprising the invention may be mounted upon tables, stands or any other structures known in the art to support such components, and that the orientation, relative size and location of such components depicted in the various figures of the drawings are exemplary only.

Figure 19:
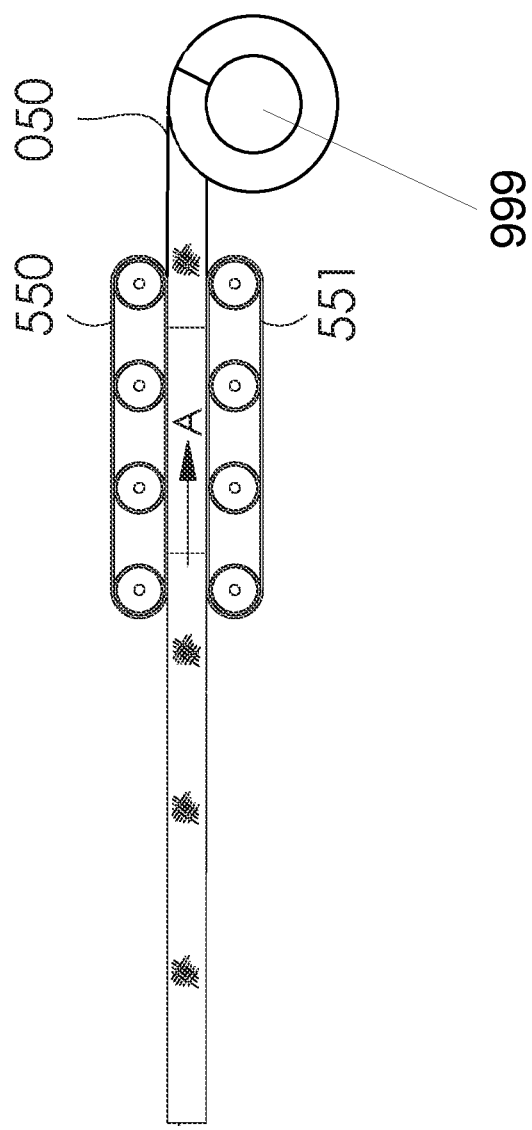
FIG. 19 depicts an optional cylindrical mandrel for producing nontraditional composite shapes.

Referring to FIG. 19, the system and method of the invention may be used to produce wetted composite preforms, panels and other structures that may be handled in the wetted state to produce such nontraditional shapes as spiral columns. In the spiral column example, wetted preforms of rectangular cross-section may be produced by first producing such preforms by any of the methods known in the art or as discussed herein, producing rectangular cross-section preform 050 which may then be wetted by any of the techniques and methods described herein. The wetted rectangular cross-section preform may then be wrapped around a cylindrical mandrel 999 in a tight spiral fashion such that each wrap on the spiral causes the edges of the rectangular wetted preform to come into contact. Mold release may be used on the mandrel if it is desired that the mandrel be removed from the resulting spiral column. The wetted fiberglass rectangular cross-section preforms may then be cured by any of the methods discussed herein including light cure, heat cure, electron beams cure or self-cure. The mandrel may be left in place for structural reasons, such as in the case when the mandrel is a shaped foam core, or the mandrel may be removed resulting in a hollow cross-section composite structure. The mandrel, and therefore the resulting composite structure, may be of any cross-sectional shape including circular, elliptical, rectangular, square any polygon or any other shape as desired by the user.

Any of the embodiments of the invention may also optionally comprise blades or wipers comprised of rubber or plastic material that operate to wipe excess resin from composite preforms 050, 051 or 052. These blades may be shaped in a complimentary configuration to the cross sectional shape of the composite preform and may operate to wipe resin from only a part, or all, of the wetted composite preform.

Figure 18:
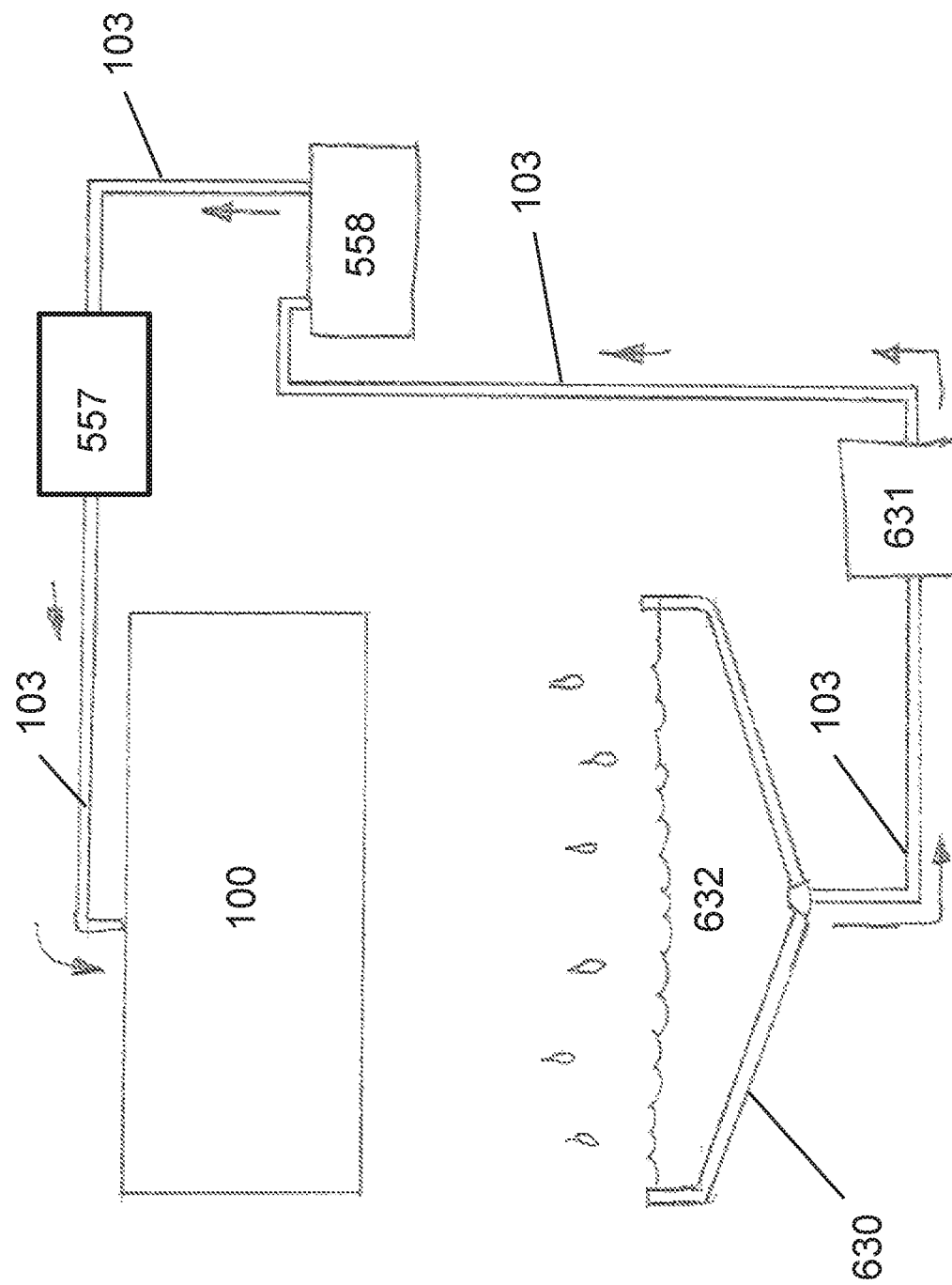
FIG. 18 depicts the optional resin sump system of the invention which may comprise any of the embodiments of the invention.

Referring now to FIG. 18, any of the embodiments of the invention may also optionally comprise a resin collection sump system which collects excess resin that is not cured with the wetted composite preform and then pumps the collected excess resin into resin reservoir 558. The resin collection sump system may comprise one or more sump basins to collect excess resin 632 as it drains from the wetting station due to gravity. The sump basin(s) 630 may be in fluid communication with a resin sump pump 631 via resin conduction means 103. Resin sump pump 631 may pump resin from any or all of the basins into resin reservoir 558 via resin conduction means 103. Typically, the sump basins are located underneath the wetting station and may optionally comprise the bottom portion of wetting enclosure 101. The use of cure on demand resins allows the resin to remain fluid so that the sump system may collect the excess resin as it gravity feeds into the sump basins 630, and pump it back into resin reservoir 558 where it may be pumped into the wetting means of wetting station 100 by resin pump 557.

The system and method of the invention are able to run continuously: that is, a composite preforms may be continuously wetted and cured by the system and method of the invention. This allows the invention to be used in conjunction with composite preform production systems that run continuously, such as the system described in the '469 patent.

The composite preform wetting and curing system and method of the present invention provides significant advantages over the pultrusion systems of the prior art. Increased throughput rate, the ability to utilize ultraviolet cure methods, and more structurally efficient composite structures are achievable with the invention, especially when the present system is used in combination with continuous preform composite fabrications systems such as that described in U.S. Pat. No. 6,543,469 to Lewit et al.

Although a detailed description as provided in the attachments contains many specific details for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

What is claimed is:

1. A system for producing a composite structure, comprising:
   a conveyor for motivating a composite preform along a longitudinal axis of motivation, wherein said composite preform is defined as having a structural foam core at least partially covered with an unwetted fabric attached to said foam core;
   a wetting station comprising a plurality of spray heads in fluid communication with a controllable resin pump via a first resin conduction means, and wherein said resin pump is in fluid communication with a resin reservoir containing resin via a second resin conduction means;
   a cylindrical mandrel for shaping the composite preform:
   a curing station; and
   a resin collection sump system comprising a sump basin for collecting excess resin as it drains away from said wetting station, said sump basin in fluid communication with a sump pump, and said sump pump being in fluid communication with a reservoir, and said reservoir being in fluid communication with said wetting means via said resin pump;
   wherein:
   said wetting station, said cylindrical mandrel, and said curing station are each located along said longitudinal axis of motivation, such that said composite preform is motivated by said conveyor to pass through said wetting station first, then wrapped around the cylindrical mandrel in a tight spiral on the cylindrical mandrel, and then through said curing station;
   a resin flow rate through the plurality of spray heads is controlled by the controllable resin pump such that said unwetted fabric is saturated with resin by the plurality of spray heads when said controllable resin pump motivates said resin from said resin reservoir to the plurality of spray heads while said composite preform is motivated through said wetting station by said conveyor;

the plurality of spray heads being disposed both above and below the conveyor, so as to spray resin onto opposing surfaces of said composite preform as said composite preform is motivated along said longitudinal axis of motivation through said wetting station, such that unwetted fabric on both opposing surfaces is saturated with resin;

said curing station is disposed to at least partially cure said resin while said composite preform is motivated through said curing station by said conveyor; and wherein said conveyor is further defined as a motor-driven conveyor.

2. The system of claim 1, wherein said foam core is further defined as a self-expanding foam that has been injected into a forming die while applying said fabric such that interstitial spaces in said fabric are filled with said self-expanding foam.

3. The system of claim 1, wherein said curing station is further defined as comprising a heating element disposed so as to radiate heat energy onto said composite preform as said composite preform is motivated along said longitudinal axis of motivation through said curing station.

4. The system of claim 1, wherein said curing means is further defined as at least one lighting element disposed so as to radiate light energy onto said composite preform as said composite preform is motivated along said longitudinal axis of motivation through said wetting station.

5. The system of claim 1, wherein said curing means is further defined as at least one ionizing radiation source disposed so as to radiate ionizing radiation onto said composite preform as said composite preform is motivated along said longitudinal axis of motivation through said wetting station.

6. The system of claim 4, wherein said composite preform is characterized by cross-sections of different sizes and shapes taken at different locations along said composite structure.

7. The system of claim 5, wherein said composite preform is characterized by cross-sections of different sizes and shapes taken at different locations along said composite structure.

* * * * *